US009062791B2

(12) United States Patent
Nakamura et al.

(10) Patent No.: US 9,062,791 B2
(45) Date of Patent: Jun. 23, 2015

(54) ELECTRIC CONNECTION STRUCTURE OF ELECTROMAGNETIC VALVE DRIVE ASSEMBLY, ELECTROMAGNETIC VALVE DRIVE ASSEMBLY, AND VEHICLE BRAKE FLUID PRESSURE CONTROL APPARATUS

(75) Inventors: Motoyasu Nakamura, Nagano (JP); Yoshiyuki Takamatsu, Nagano (JP); Takaaki Komaba, Nagano (JP)

(73) Assignee: NISSIN KOGYO CO., LTD., Nagano (JP)

( * ) Notice: Subject to any disclaimer, the term of this patent is extended or adjusted under 35 U.S.C. 154(b) by 342 days.

(21) Appl. No.: 13/477,675

(22) Filed: May 22, 2012

(65) Prior Publication Data

US 2012/0298897 A1  Nov. 29, 2012

(30) Foreign Application Priority Data

May 23, 2011  (JP) .................................. 2011-114506
May 23, 2011  (JP) .................................. 2011-114507
May 23, 2011  (JP) .................................. 2011-114508

(51) Int. Cl.
*F15B 13/08* (2006.01)
*F16K 31/06* (2006.01)
*B60T 8/36* (2006.01)
(Continued)

(52) U.S. Cl.
CPC ............ *F16K 31/0675* (2013.01); *B60T 8/3675* (2013.01); *B60T 8/4081* (2013.01); *H01F 7/127* (2013.01); *H01F 2007/062* (2013.01)

(58) Field of Classification Search
CPC ............ F16K 31/0675; F15B 13/0857; F15B 13/0835; F15B 13/0842; F16H 61/0009; F16H 61/0251; F16H 61/0003; F16H 61/0006; H01H 50/443; H05K 1/18; H01F 2007/062

USPC ................... 335/282; 251/129.15; 303/119.3; 137/315.03, 315.27, 884

See application file for complete search history.

(56) References Cited

U.S. PATENT DOCUMENTS 4,438,997 A * 3/1984 Evans ........................... 439/391
4,866,579 A * 9/1989 Miller et al. .................. 362/492

(Continued)

FOREIGN PATENT DOCUMENTS

JP  H05505446  8/1993
JP  08135830  5/1996

(Continued)

OTHER PUBLICATIONS

Satoru et al, Translation of JP2004-360864, Dec. 24, 2004, JPO. Retrieved from http://www4.ipdl.inpit.go.jp on Jun. 10, 2014.*

(Continued)

*Primary Examiner* — John K Fristoe, Jr.
*Assistant Examiner* — Seth W MacKay-Smith
(74) *Attorney, Agent, or Firm* — Andrew M. Calderon; Roberts Mlotkowski Safran & Cole, P.C.

(57) ABSTRACT

An electric connection structure of a solenoid valve drive assembly has a solenoid valve, a coil that drives the solenoid valve, and a housing in which the solenoid valve and the coil are located, so that a terminal of the coil and a terminal inside the housing are electrically connected to each other. In the electric connection structure, a coil urging part that urges the coil is provided between the housing and the coil, and the coil urging part has: a base portion to be attached to the housing, and an elastic portion that extends from the base portion to press the coil.

22 Claims, 13 Drawing Sheets

(51) Int. Cl.
*H01F 5/04* (2006.01)
*B60T 8/40* (2006.01)
*H01F 7/127* (2006.01)
*H01F 7/06* (2006.01)

(56) References Cited

U.S. PATENT DOCUMENTS

| | | | | |
|---|---|---|---|---|
| 5,127,440 | A * | 7/1992 | Maas et al. | 137/884 |
| 5,449,227 | A * | 9/1995 | Steinberg et al. | 303/119.2 |
| 5,452,948 | A * | 9/1995 | Cooper et al. | 303/119.3 |
| 5,462,344 | A * | 10/1995 | Jakob et al. | 303/119.3 |
| 5,842,753 | A * | 12/1998 | Staib et al. | 303/119.3 |
| 5,887,624 | A * | 3/1999 | Taniguchi et al. | 137/884 |
| 6,000,679 | A * | 12/1999 | Reuter et al. | 251/129.15 |
| 6,036,447 | A * | 3/2000 | Kawaguchi et al. | 417/222.2 |
| 6,120,114 | A * | 9/2000 | Blazic et al. | 303/119.2 |
| 6,124,775 | A * | 9/2000 | Linkner, Jr. | 335/278 |
| 6,164,732 | A * | 12/2000 | Tominaga et al. | 303/119.3 |
| 6,354,674 | B1 * | 3/2002 | Iwamoto et al. | 303/119.3 |
| 6,371,166 | B1 * | 4/2002 | Yoshizawa et al. | 137/884 |
| 6,719,267 | B2 * | 4/2004 | Torii et al. | 251/129.15 |
| 6,985,060 | B2 * | 1/2006 | Parker et al. | 335/282 |
| 7,334,848 | B2 * | 2/2008 | Segawa et al. | 303/119.3 |
| 7,419,228 | B2 * | 9/2008 | Jocham | 303/119.3 |
| 7,785,160 | B2 * | 8/2010 | Shimizu | 439/852 |
| 2003/0010390 | A1 | 1/2003 | Beck et al. | |
| 2004/0012257 | A1 | 1/2004 | Jocham | |

FOREIGN PATENT DOCUMENTS

| | | | |
|---|---|---|---|
| JP | H08247324 A | 9/1996 | |
| JP | H09267735 A | 10/1997 | |
| JP | 3364990 B | 1/2003 | |
| JP | 2003522677 A | 7/2003 | |
| JP | 2004517781 A | 6/2004 | |
| JP | 2004360864 A | 12/2004 | |
| JP | 2004360864 A * | 12/2004 | F16K 31/06 |
| JP | 3660302 B | 6/2005 | |

OTHER PUBLICATIONS

Japanese Patent Office Action for Application No. 2011-114507 dated Jan. 14, 2014; drafted on Jan. 8, 2014, 10 pages.
Japanese Patent Office Action for Application No. 2011-114506 dated May 21, 2013; drafted May 17, 2013.

* cited by examiner

TOP ←→ BOTTOM

ELECTRIC CONNECTION STRUCTURE OF ELECTROMAGNETIC VALVE DRIVE ASSEMBLY, ELECTROMAGNETIC VALVE DRIVE ASSEMBLY, AND VEHICLE BRAKE FLUID PRESSURE CONTROL APPARATUS

FIELD

The present invention relates to an electric connection structure of a solenoid valve drive assembly and a vehicle brake fluid pressure control apparatus for connection of a coil for driving a solenoid valve to a housing.

BACKGROUND

Examples of an electric connection structure of a solenoid valve drive assembly of this type include one disclosed in JP-B-3660302 proposed by the present applicant. In this electric connection structure, a first terminal is protruded from a coil (electric component assembly) positioned and located at one surface of a base body, and a housing, attached to the one surface of the base body while the housing covers the coil, is provided with a second terminal.

In the electric connection structure according to JP-B-3660302, it is unnecessary to absorb assembly tolerances between components included in the coil when the terminals are connected to each other by resistance welding, thus enabling a reduction in size of the coil.

Actually, when the coil for driving a solenoid valve is increased in size, in order to restrict coil oscillation or rotation movement and to relieve a stress (load) applied to a connection region of the terminals, it is necessary to absorb oscillation by holding the coil by a plate spring or the like, for example. A plate spring for urging a coil toward a housing is used in JP-A-2004-360864, for example.

However, firstly, in the plate spring structure disclosed in JP-A-2004-360864, elastic portions of the plate spring for exerting a spring force are formed by being bent in multiple stages toward inside (center), and therefore, a plurality of bending steps are required in manufacturing the plate spring, thereby causing a problem that manufacturing cost is increased.

Secondly, when an attempt is made to incorporate the coil into the housing with the coil urged by the plate spring, it is difficult to perform welding work for a terminal of the coil and that of the housing. Specifically, this is because in order to incorporate the coil into the housing, the terminal of the coil and that of the housing have to be welded to each other while the urged state of the coil is maintained in a state where a solenoid valve is inserted through the coil.

On the other hand, as an electric component assembly, for example, JP-B-3364990 discloses a structure in which a bus bar electrically connected to a coil is buried in an attachment wall of a housing.

In this case, when the coil for driving a solenoid valve is increased in size, in order to restrict coil oscillation or rotation movement, it is conceivable that oscillation may be absorbed by holding the coil by a plate spring or the like, for example.

However, for example, when the housing is formed by a resin material in the structure of the electric component assembly disclosed in JP-B-3364990, the resin housing receives a reaction force of the coil that is increased in size, and therefore, the housing might be deformed.

SUMMARY

The present invention has been made in view of the above points, and its object is to provide an electric connection structure of a solenoid valve drive assembly, which simplifies a structure of a coil urging part for urging a coil and thus enables a reduction in manufacturing cost.

Further, the present invention has been made in view of the above points, and its object is to provide an electric connection structure of a solenoid valve drive assembly and a vehicle brake fluid pressure control apparatus, which enable an improvement in welding workability when a terminal of a coil and a terminal inside a housing are welded to each other.

Furthermore, the present invention has been made in view of the above points, and its object is to provide an electric component assembly and a vehicle brake fluid pressure control apparatus, which enable enhancement in strength of a housing.

The present invention provides an electric connection structure of a solenoid valve drive assembly, which has a solenoid valve, a coil that drives the solenoid valve, and a housing in which the solenoid valve and the coil are located, so that a terminal of the coil and a terminal inside the housing are electrically connected to each other, the electric connection structure having coil urging means that urges the coil, the coil urging means provided between the housing and the coil, wherein the coil urging means has: a base portion to be attached to the housing; and an elastic portion that extends from the base portion to press the coil.

According to the present invention, the elastic portion of the coil urging means that presses the coil is extended from the base portion, thus making it possible to easily manufacture the coil urging means by performing a bending step in only one direction and to reduce manufacturing cost thereof.

Further, the base portion may be substantially U-shaped in plan view, and the elastic portion may be extended from each of ends of the base portion. According to this, a load of each elastic portion to be applied to the coil can be easily set. Note that the substantially U-shaped base portion may be formed into a partially separated shape, and examples of the substantially U-shaped base portion include a base portion that is substantially C-shaped in plan view.

Further, the base portion may be substantially O-shaped in plan view. According to this, a load applied to the elastic portion can be increased. Note that the substantially O-shaped base portion may have an endless shape formed continuously without being separated, and examples of the substantially O-shaped base portion include, in addition to a circularly-shaped base portion and an elliptically-shaped base portion, a rectangularly-shaped base portion and a polygonally-shaped base portion in plan view.

Still further, the solenoid valve may pass through a center of the base portion. According to this, it is possible to avoid interference of the coil urging means with the solenoid valve at the time of assembly of the housing. Consequently, the resulting solenoid valve drive assembly can be prevented from being unnecessarily increased in size.

Still further, the coil urging means may be provided with a held portion to be held by the housing. According to this, in a state where the coil urging means is interposed in advance between the coil and the housing so that the coil is urged, the housing can be easily attached to a member to which the housing is to be attached. Further, with the coil urged by the coil urging means, the terminal of the coil and the terminal inside the housing can be easily welded to each other.

Further, the coil and the housing may include a rotation restricting part that restricts rotation of the coil at a region other than a connection region where the terminal of the coil and the terminal inside the housing are connected to each other.

According to this, when the coil is welded to the housing, the terminal of the coil and the terminal inside the housing can be welded to each other in a state where rotation of the coil is prevented by the rotation restricting part at the region other than the connection region where the terminal of the coil and the terminal inside the housing are connected to each other; hence, welding workability can be improved.

Furthermore, according to this, rotation of the coil can be prevented without using any special jig; therefore, for example, the terminal of the coil into which the solenoid valve is incorporated and the terminal inside the housing can be easily welded to each other.

Further, rotation of the coil may be restricted by means of concavo-convex fitting of the coil and the housing. According to this, rotation of the coil with respect to the housing can be easily prevented.

Further, either one of concave and convex portions included in the rotation restricting part may be provided at a yoke. According to this, the rotation restricting part can be easily formed by using the yoke of the coil.

Still further, the rotation restricting part may include: a convex portion that is protruded outward in a radial direction of the coil; and a concave portion formed at an intermediate wall of the housing. According to this, convexo-concave fitting of the convex and concave portions can be easily formed.

The present invention is suitably applied to the electric connection structure of the solenoid valve drive assembly, in which the coil urging part that urges the coil toward a member to which the housing is to be attached is provided between the housing and the coil. Thus, even when the coil urging part is provided, the terminal of the coil and the terminal inside the housing can be easily connected to each other in the state where the coil is urged.

Further, a protruded length of the protrusion is more preferably set to be equal to or larger than a height dimension of the coil urging part. According to this, positioning of the terminal of the coil and the terminal inside the housing is easily performed, thus simplifying the welding of the terminals.

Still further, the member to which the housing is to be attached may be formed by aluminum or an aluminum alloy. In such an aspect, the member to which the housing is to be attached can be used as a heat dissipating/absorbing member (heat sink) for the coil.

The present invention can be suitably used for a vehicle brake fluid pressure control apparatus when a fluid pressure sensor for detecting a brake fluid pressure is provided inside the housing and a terminal of the fluid pressure sensor is electrically connected to the terminal inside the housing. Moreover, similarly to the solenoid valve, the fluid pressure sensor that controls the brake fluid pressure can also be contained inside the housing. As a result, size reduction of the housing can be promoted.

Further, in the above solenoid valve drive assembly, a bus bar electrically connected to the coil may be included, the housing may have an attachment wall in which the bus bar is buried, the coil urging part may be provided between the attachment wall and the coil, and the bus bar may be buried at least in a region of the attachment wall where the coil urging part is to be attached.

According to this, the bus bar functions as a reinforcement member for the attachment wall, and the region where the coil urging part is to be attached will be reinforced by the bus bar. Thus, for example, even when an additional reinforcement member is not provided in the housing, the attachment wall is not increased in thickness or a rib shape is not provided, the strength of the attachment wall can be enhanced, which eventually enables adaptation to size increase of the coil located inside the housing. As a result, size and weight of the housing can be prevented from being unnecessarily increased, and an increase in the number of components can be avoided.

Further, the bus bar may be provided with a wide portion formed so as to be wider than the other portion of the bus bar and the conductor portion may be provided with a branch portion branching off therefrom. According to this, the ratio of the area of the bus bar to the area of the attachment wall is increased, thus making it possible to further enhance the strength of the attachment wall by the strength of the bus bar itself.

Further, the coil urging part may be a plate spring for urging the coil. According to this, for example, even when the coil that is easily influenced by oscillation from outside is held by the plate spring, the strength of the attachment wall to which the plate spring is attached can be enhanced.

Further, the present invention provides a vehicle brake fluid pressure control apparatus that controls a brake fluid pressure, wherein the vehicle brake fluid pressure control apparatus includes the above-described solenoid valve drive assembly, and wherein the solenoid valve serves to control a brake fluid pressure.

According to this, the above-described solenoid valve drive assembly can be suitably applied to the vehicle brake fluid pressure control apparatus, and furthermore, the coil that drives the solenoid valve that serves to control the brake fluid pressure can be located inside the housing. As a result, general versatility of the solenoid valve drive assembly can be improved.

According to the present invention, it is possible to obtain an electric connection structure of a solenoid valve drive assembly, which simplifies a structure of coil urging means for urging a coil and thus enables a reduction in manufacturing cost.

Further, according to the present invention, it is possible to obtain an electric connection structure of a solenoid valve drive assembly and a vehicle brake fluid pressure control apparatus, which enable an improvement in welding workability when a terminal of a coil and a terminal inside a housing are welded to each other.

Furthermore, according to the present invention, it is possible to obtain an electric component assembly and a vehicle brake fluid pressure control apparatus, which enable enhancement in strength of a housing.

DETAILED DESCRIPTION OF THE EMBODIMENTS

Hereinafter, the best mode for carrying out the present invention will be described in detail with reference to the appended drawings. Note that for the sake of convenience, a "vertical direction" is defined on the assumption that a side where a cover member is attached is an "upper side", but an actual attachment direction is not limited to the "vertical direction".

Figure 1:
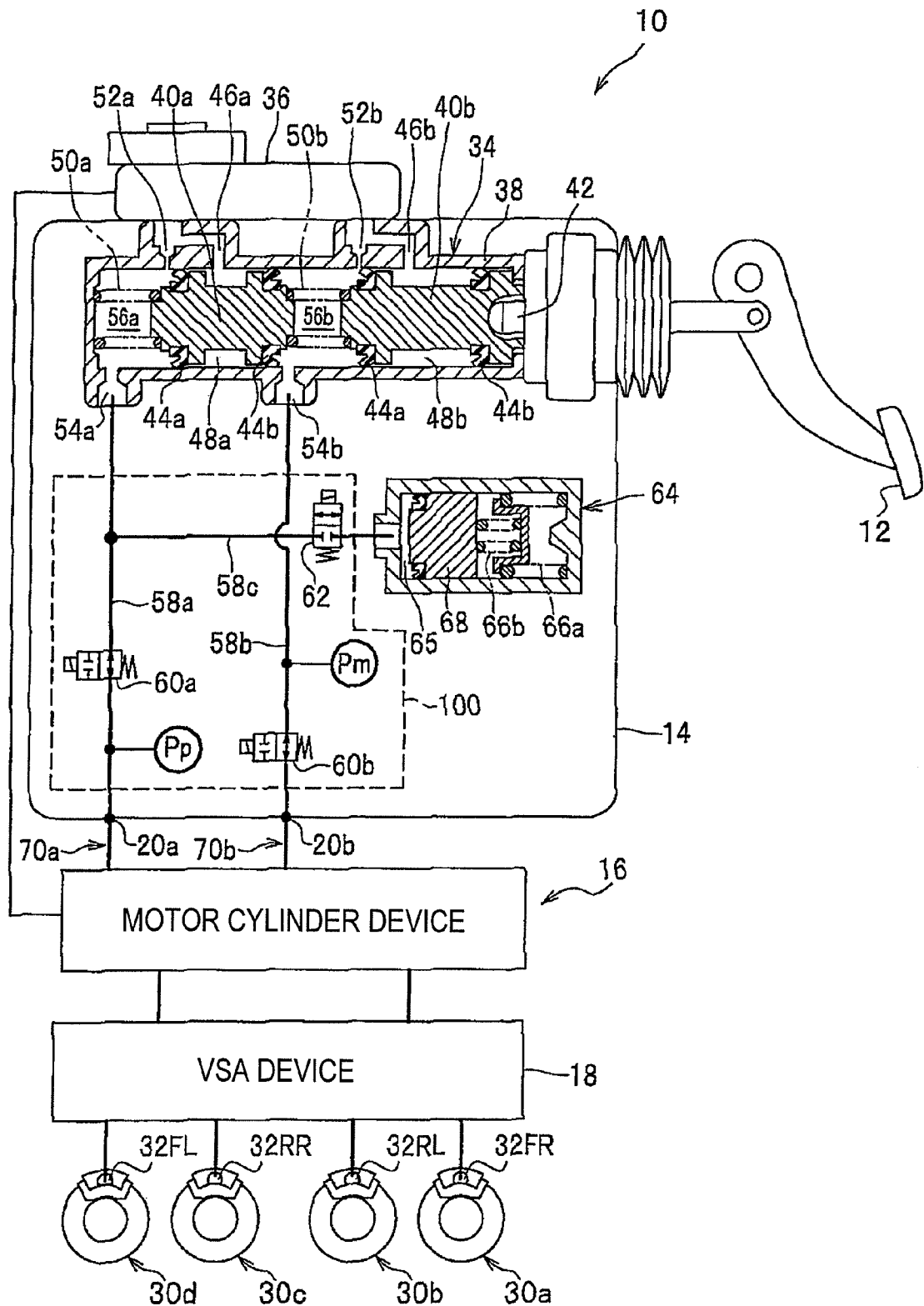
FIG. 1 is a schematic configuration diagram of a vehicle brake system into which a vehicle brake fluid pressure control apparatus according to an embodiment of the present invention is incorporated.

As illustrated in FIG. 1, a vehicle brake fluid pressure control apparatus (hereinafter referred to as a "brake control apparatus") according to an embodiment of the present invention is suitable for use in a vehicle such as a motorcycle, a motor tricycle, an all-terrain vehicle (ATV) or a four-wheel car, and appropriately controls a braking force (brake fluid pressure) applied to wheel(s) of the vehicle. The following description is based on an example in which the brake control apparatus is applied to an unillustrated four-wheel car, but is not intended to limit the vehicle on which the brake control apparatus is installed.

FIG. 1 is a schematic configuration diagram of a vehicle brake system into which the vehicle brake fluid pressure control apparatus according to the embodiment of the present invention is incorporated.

The vehicle brake system 10 illustrated in FIG. 1 is formed to include both of: a by-wire brake system which serves as a brake system for normal use and by which a brake is operated by electric signal transmission; and an old-type hydraulic brake system which serves as a brake system for fail-safe use and by which the brake is operated by hydraulic transmission.

Therefore, as illustrated in FIG. 1, the vehicle brake system 10 is basically formed to separately include: an input device 14 for inputting an operation when a brake pedal (brake operation element) 12 is operated by an operator; a motor cylinder device 16 for controlling a brake fluid pressure by a cylinder (not illustrated) driven by an unillustrated motor; and a vehicle stability assist device 18 (hereinafter referred to as a "VSA device 18" [VSA is a registered trademark]) for assisting the vehicle in achieving behavior stabilization.

The input device 14, the motor cylinder device 16 and the VSA device 18 are connected to one another via a fluid pressure path formed by a pipe material such as a hose or a tube, for example; in addition, as the by-wire brake system, the input device 14 and the motor cylinder device 16 are electrically connected to each other via an unillustrated harness.

The VSA device 18 is formed by a known VSA device, and a brake fluid is supplied to respective wheel cylinders 32FR, 32RL, 32RR and 32FL of disk brake mechanisms 30a to 30d through piping tubes connected to a plurality of outlet ports. Fluid pressures inside the respective wheel cylinders 32FR, 32RL, 32RR and 32FL are increased, thereby operating the respective wheel cylinders 32FR, 32RL, 32RR and 32FL and applying braking forces to associated wheels (right front wheel, left rear wheel, right rear wheel and left front wheel).

Note that the vehicle brake system 10 is provided so as to be installable on various vehicles including an automobile driven only by an engine (internal combustion engine), a hybrid automobile, an electric automobile, and a fuel cell automobile, for example.

The input device 14 has: a tandem master cylinder 34 capable of producing a fluid pressure in response to an operation performed on the brake pedal 12 by a driver (operator); and a reservoir 36 fixed on the master cylinder 34. Inside a cylinder tube 38 of the master cylinder 34, first and second pistons 40a and 40b, located away from each other at a given distance along an axial direction of the cylinder tube 38, are slidably arranged. The second piston 40b is located close to the brake pedal 12, and is connected to the brake pedal 12 via a push rod 42 so as to be directly operated. On the other hand, the first piston 40a is located further away from the brake pedal 12 than the second piston 40b.

Note that the cylinder tube 38 of the master cylinder 34 is formed by aluminum or an aluminum alloy, and functions as a counterpart member to which a housing of the brake control apparatus, which will be described later, is to be attached (see FIG. 6 described later).

A pair of cup seals 44a and 44b are attached to an outer peripheral surface of each of the first and second pistons 40a and 40b via annular steps. Rear chambers 48a and 48b communicated with supply ports 46a and 46b, which will be described later, are each formed between the associated pair of cup seals 44a and 44b. Further, a spring member 50b is provided between the first and second pistons 40a and 40b, and a spring member 50a is provided between the piston 40a and a lateral end (bottom wall) of the cylinder tube 38. Note that each pair of the cup seals 44a and 44b may be attached to an inner wall of the cylinder tube 38 via annular grooves.

The cylinder tube 38 of the master cylinder 34 is provided with: the two supply ports 46a and 46b; two relief ports 52a and 52b; and two output ports 54a and 54b. In this case, the supply port 46a (46b) and the relief port 52a (52b) are provided so as to be merged with each other and communicated with an unillustrated reservoir chamber inside the reservoir 36.

Furthermore, inside the cylinder tube 38 of the master cylinder 34, there are provided first and second pressure chambers 56a and 56b for producing a brake fluid pressure corresponding to a pedal pressure exerted on the brake pedal 12 by the driver. The first pressure chamber 56a is provided so as to be communicated with a connection port 20a via a first fluid pressure passage 58a, and the second pressure chamber 56b is provided so as to be communicated with a connection port 20b via a second fluid pressure passage 58b.

A first shut-off valve 60a formed by a normally open type solenoid valve is provided between the master cylinder 34 and the connection port 20a and at upstream side of the first fluid pressure passage 58a, and a pressure sensor Pp is provided at downstream side of the first fluid pressure passage 58a. The pressure sensor Pp detects a fluid pressure of a downstream side region of the first fluid pressure passage 58a, which is located closer to the wheel cylinders 32FR, 32RL, 32RR and 32FL than the first shut-off valve 60a.

A pressure sensor Pm is provided between the master cylinder 34 and the connection port 20b and at upstream side of the second fluid pressure passage 58b, and a second shut-off valve 60b formed by a normally open type solenoid valve is provided at downstream side of the second fluid pressure passage 58b. The pressure sensor Pm detects a fluid pressure of an upstream side region of the second fluid pressure passage 58b, which is located closer to the master cylinder 34 than the second shut-off valve 60b.

The normally open type first and second shut-off valves 60a and 60b each mean a valve formed so that a normal position (i.e., a position of a valve body at the time of non-energization) becomes an open position (or the valve is normally open).

A region of the first fluid pressure passage 58a, located between the master cylinder 34 and the first shut-off valve 60a, is provided with a branch fluid pressure passage 58c branching off from the first fluid pressure passage 58a. The branch fluid pressure passage 58c is connected in series with: a third shut-off valve 62 formed by a normally closed type solenoid valve; and a stroke simulator 64. The normally closed type third shut-off valve 62 means a valve formed so that a normal position (i.e., a position of a valve body at the time of non-energization) becomes a closed position (or the valve is normally closed).

The stroke simulator 64 is a device for producing brake stroke and reaction force at the time of by-wire control so that the operator feels as if a braking force is produced by a pedal pressure. The stroke simulator 64 is located closer to the master cylinder 34 than the first shut-off valve 60a provided on the first fluid pressure passage 58a. The stroke simulator 64 is provided with a fluid pressure chamber 65 communicated with the branch fluid pressure passage 58c, so that a brake fluid derived from the first pressure chamber 56a of the master cylinder 34 is absorbable via the fluid pressure chamber 65.

Furthermore, the stroke simulator 64 is provided to include: a first return spring 66a having a high spring constant; a second return spring 66b having a low spring constant; and a simulator piston 68 urged by the first and second return springs 66a and 66b, and the first and second return springs 66a and 66b are located in series, thus allowing a pedal feeling of the brake pedal 12 to be equivalent to that provided by an existing master cylinder.

The motor cylinder device 16 includes: an actuator mechanism (not illustrated) having an electric motor and a driving force transmission part, which are not illustrated; and a cylinder provided with an unillustrated slave piston urged by the actuator mechanism.

The vehicle brake system 10 into which the vehicle brake fluid pressure control apparatus according to the present embodiment is incorporated is basically formed as described above. Next, operations of the vehicle brake system 10 will be schematically described.

Under ordinary conditions in which the vehicle brake system 10 functions in an ordinary manner, the first and second shut-off valves 60a and 60b, each formed by a normally open type solenoid valve, are energized and put in valve closed states, and the third shut-off valve 62, formed by a normally closed type solenoid valve, is energized and put in a valve open state. Accordingly, a first fluid pressure system 70a and a second fluid pressure system 70b are shut off by the first shut-off valve 60a and the second shut-off valve 60b, respectively, and therefore, the brake fluid pressure produced by the master cylinder 34 of the input device 14 will not be transmitted to the wheel cylinders 32FR, 32RL, 32RR and 32FL of the disk brake mechanisms 30a to 30d.

In this case, the brake fluid pressure produced in the first pressure chamber 56a of the master cylinder 34 is transmitted to the fluid pressure chamber 65 of the stroke simulator 64 via the branch fluid pressure passage 58c and the third shut-off valve 62 that is in the valve open state. The simulator piston 68 is displaced against spring forces of the spring members (first and second return springs) 66a and 66b by the brake fluid pressure supplied to the fluid pressure chamber 65, thus permitting a stroke of the brake pedal 12 and producing a pseudo pedal reaction force, which will be applied to the brake pedal 12. As a result, a brake feeling, which will not give a sense of discomfort to the driver, is obtained.

In such a system state, when stepping-on of the brake pedal 12 by the driver is detected based on a detection signal from an unillustrated stroke sensor, for example, an unillustrated controller drives the electric motor of the motor cylinder device 16 to urge the actuator mechanism, and pressure is applied by displacement of the slave piston so that the brake fluid pressure inside the cylinder is brought into balance, thus producing a desired brake fluid pressure.

The brake fluid pressure inside the cylinder of the motor cylinder device 16 is transmitted to the wheel cylinders 32FR, 32RL, 32RR and 32FL of the disk brake mechanisms 30a to 30d via a plurality of unillustrated valves of the VSA device 18, and the wheel cylinders 32FR, 32RL, 32RR and 32FL are operated, thus applying a desired braking force to each wheel.

In other words, under ordinary conditions in which the motor cylinder device 16 functioning as a power fluid pressure source and an unillustrated ECU or the like for performing by-wire control are operable, the vehicle brake system 10 according to the present embodiment is operated as follows. The communication between the master cylinder 34 for producing a brake fluid pressure by stepping-on of the brake pedal 12 by the driver and the disk brake mechanisms 30a to 30d (i.e., the wheel cylinders 32FR, 32RL, 32RR and 32FL) for applying brakes to the respective wheels is cut off by the first and second shut-off valves 60a and 60b. In this state, the disk brake mechanisms 30a to 30d are operated by the brake fluid pressure produced by the motor cylinder device 16, thus allowing a so-called "brake-by-wire" brake system to be active.

On the other hand, under abnormal conditions in which the motor cylinder device 16, for example, is not operable, the first and second shut-off valves 60a and 60b are each put in the valve open state and the third shut-off valve 62 is put in the valve closed state, so that the brake fluid pressure produced by the master cylinder 34 is transmitted to the disk brake mechanisms 30a to 30d (i.e., the wheel cylinders 32FR, 32RL, 32RR and 32FL) and the disk brake mechanisms 30a to 30d (i.e., the wheel cylinders 32FR, 32RL, 32RR and 32FL) are operated, thus allowing a so-called "old-type hydraulic brake system" to be active.

Next, a specific structure of the brake control apparatus 100 incorporated into the vehicle brake system 10 will be described in detail below with reference to FIGS. 2 to 14.

Figure 2:
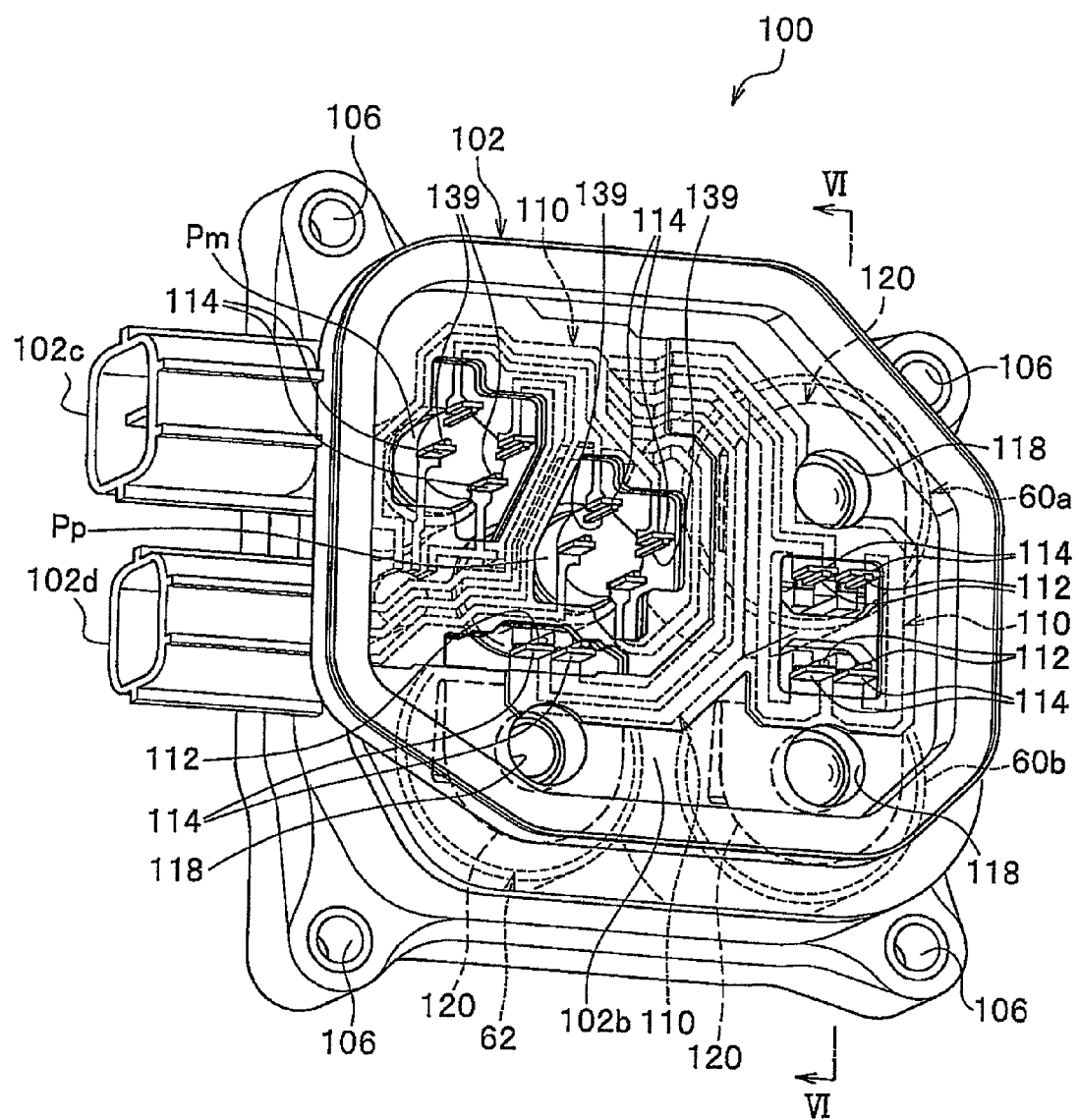
FIG. 2 is a perspective view illustrating a state where a cover member is detached from a housing of the vehicle brake fluid pressure control apparatus.

FIG. 2 is a perspective view illustrating a state where a cover member is detached from the housing of the vehicle brake fluid pressure control apparatus.

Figure 3:
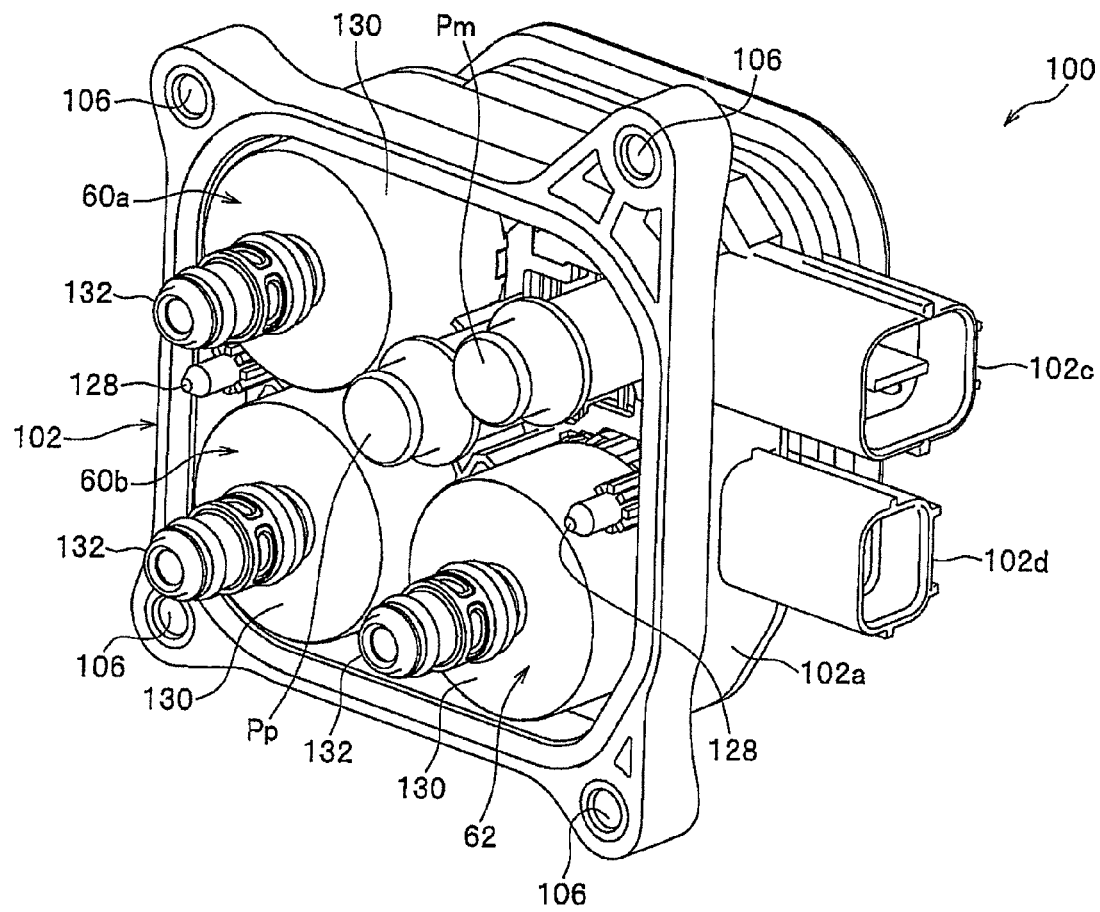
FIG. 3 is a perspective view when viewed from the rear side of FIG. 2.
Figure 4:
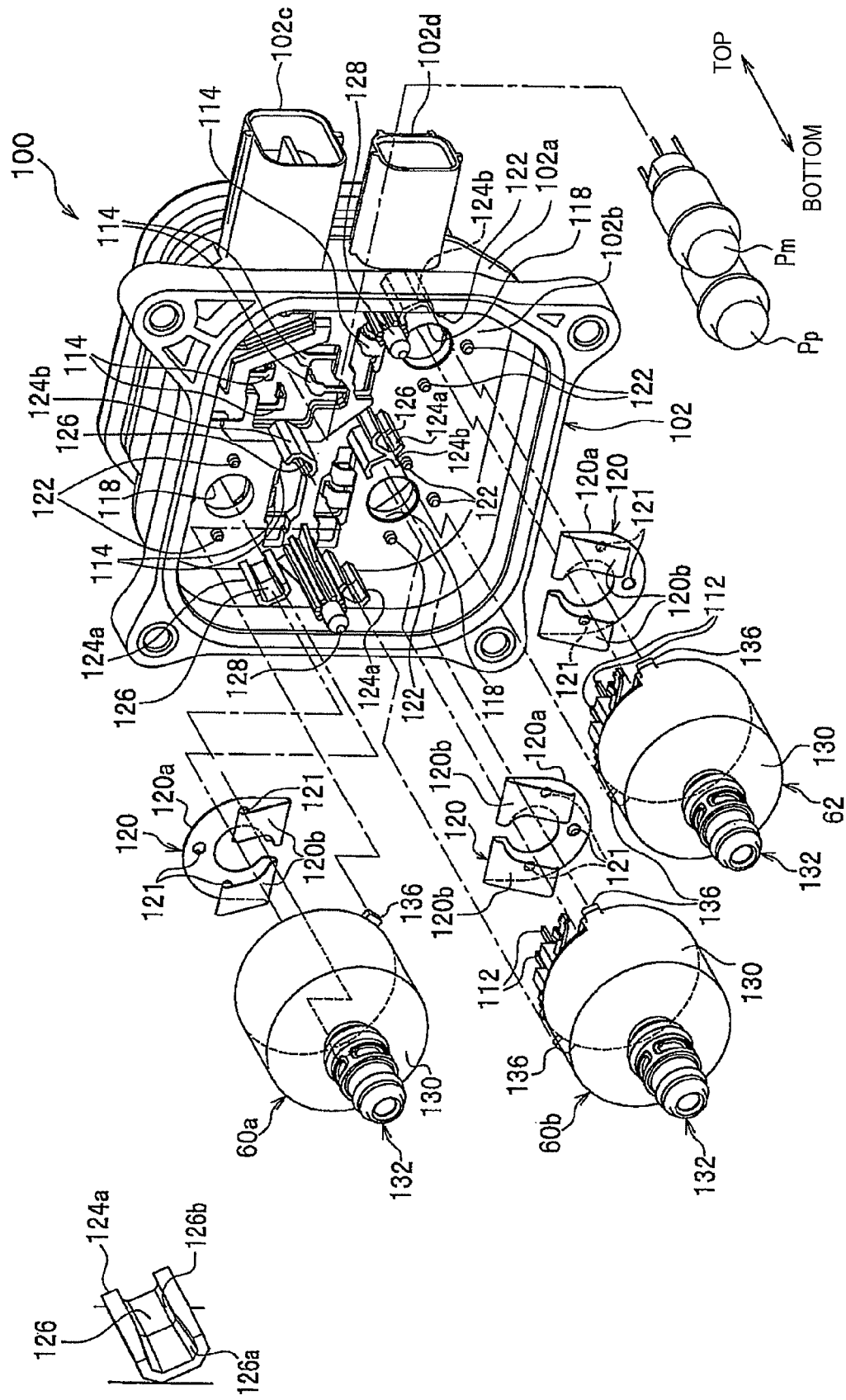
FIG. 4A is an exploded perspective view of the vehicle brake fluid pressure control apparatus.
FIG. 4B is a partially enlarged perspective view of FIG. 4A.

The brake control apparatus 100 has: the housing 102 molded in one piece by using an electrically insulating resin material; and the cover member 104 (see FIG. 6) for closing an opening of the housing 102. As illustrated in FIGS. 2 and 3, the housing 102 is attached to the cylinder tube 38 of the master cylinder 34 via bolts 108 inserted through attachment holes 106 located at four corners of the housing 102 (see FIG. 6). The cylinder tube 38 functions as a member (counterpart member) to which the housing 102 is to be attached.

As illustrated in FIG. 4A, components arranged inside the housing 102 include: the first and second shut-off valves 60a and 60b, each formed by a normally open type solenoid valve; the third shut-off valve 62 formed by a normally closed type solenoid valve; and the pressure sensors (fluid pressure sensors) Pp and Pm for detecting the fluid pressures of the brake fluid circulating through the first and second fluid pressure passages 58a and 58b (see FIG. 1).

As illustrated in FIG. 1, the first shut-off valve 60a is located downstream of a branch point between: the first fluid pressure passage 58a leading to the connection port 20a from the master cylinder 34; and the branch fluid pressure passage 58c. The pressure sensor Pp is located downstream of the first shut-off valve 60a in the first fluid pressure passage 58a. The pressure sensor Pm is located at the second fluid pressure passage 58b leading to the connection port 20b from the master cylinder 34. The second shut-off valve 60b is located downstream of the pressure sensor Pm in the second fluid pressure passage 58b. The third shut-off valve 62 is located at the branch fluid pressure passage 58c branching off from the first fluid pressure passage 58a and leading to the stroke simulator 64.

As illustrated in FIG. 4A, the housing 102 includes: a frame body 102a formed into a substantially rectangular shape in plan view; an intermediate wall 102b (see FIG. 2 and FIG. 4A) which is integrally provided at an intermediate portion of the frame body 102a formed along its vertical direction and by which upper side and lower side are defined; and a pair of connectors 102c and 102d protruded outward from an outer peripheral surface of the frame body 102a. One of the connectors, i.e., the connector 102c, is a power connector for passage of an electric current through coils described later, and the other connector, i.e., the connector 102d, is a sensor connector for supply of detection signals from the pressure sensors Pp and Pm.

As indicated by broken lines in FIG. 2, a plurality of bus bars 110, each formed by a conductive material, are buried (molded) inside the intermediate wall 102b. Ends of the bus bars 110 are electrically connected to unillustrated terminals provided at the connectors 102c and 102d. The other ends of the bus bars 110 have terminals 114 (intra-housing terminals) exposed to outside from the intermediate wall 102b and electrically connected to terminals 112 of the first to third shut-off valves 60a, 60b and 62 (i.e., terminals of the coils described later). Each bus bar 110 is extended along vertical, lateral and oblique directions of the intermediate wall 102b while a given insulation distance is maintained between the bus bars 110 adjacent to each other.

Figure 15:
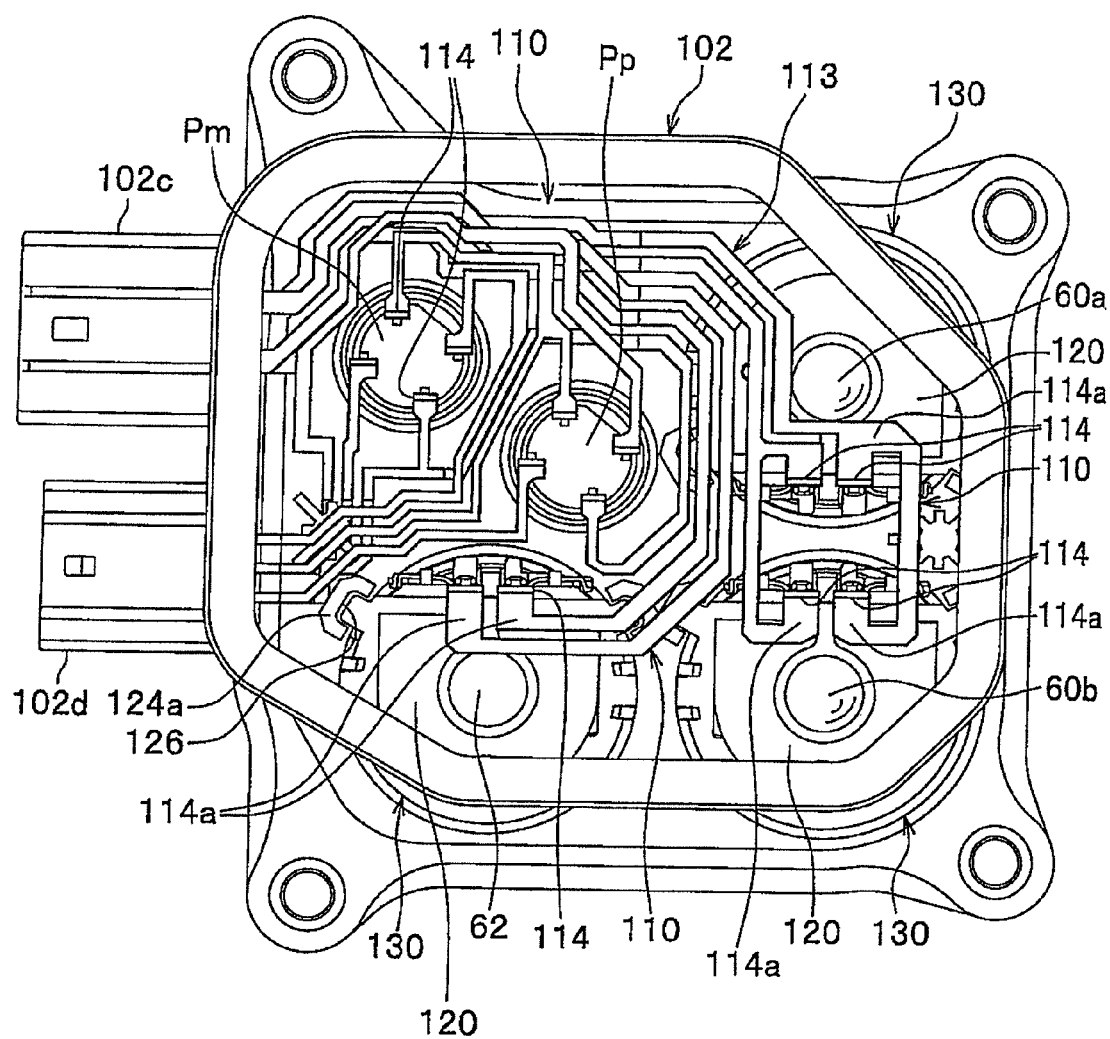
FIG. 15 is a plan view illustrating a state where an intermediate wall illustrated in FIG. 2 is removed and bus bars are exposed to outside.

FIG. 15 is a plan view illustrating a state where the intermediate wall illustrated in FIG. 2 is removed and the bus bars are exposed to outside. As illustrated in FIG. 15, the terminal 114 of each bus bar 110 has a wide portion 114a formed widely as compared with a conductor portion (other portion) 113 of each bus bar 110. The wide portions 114a are arranged so as to be located immediately above coils 130 described later, peripheral edge portions of plate springs (electric component urging parts) 120, and the pressure sensors Pp and Pm (or so as to be located close to the cover member 104).

In other words, the plurality of bus bars 110 formed so as to trail along a surface of the intermediate wall 102b are buried at least in regions of the intermediate wall 102b, to which the plate springs 120 are to be attached. Further, as illustrated in FIG. 2, each wide portion 114a is provided so as to be close to a region where the terminal 114 is exposed to outside through an opening of the intermediate wall 102b, thus making it possible to increase strength for supporting the terminal 114 exposed through the opening. Note that the wide portion 114a means a portion of the bus bar 110, which is formed to have a width dimension larger than that of the conductor portion 113. In FIG. 15, the portion of each bus bar 110, formed as the widest portion thereof, is illustrated as the wide portion 114a.

Thus, the intermediate wall 102b formed of a resin material is reinforced (strengthen) by the plurality of bus bars 110 made of conductive metal; hence, even when a reaction force of the plate spring 120 for pressing the coil 130 is applied to the intermediate wall 102b, it is possible to suitably avoid deformation of the intermediate wall 102b.

As illustrated in FIG. 4A, the intermediate wall 102b is provided with a plurality of substantially circular solenoid valve insertion holes 118 through which solenoid valves describer later are inserted. Three engagement protrusions 122, by which the associated plate spring 120 described later is engaged with the intermediate wall 102b, are formed so as to be located around and close to each solenoid valve insertion hole 118.

Furthermore, the intermediate wall 102b is provided with pairs of guide protrusions (protrusive portions) 124a and 124b protruded downward (toward the cylinder tube 38 of the master cylinder 34). The pairs of guide protrusions 124a and 124b are substantially U-shaped in plan view, and three pairs of guide protrusions 124a and 124b are provided in accordance with the first to third shut-off valves 60a, 60b and 62. At lateral walls of the guide protrusions 124a and 124b, concave portions 126 are formed, and convex portions of the coils described later are fitted into the concave portions 126, thus achieving the function of preventing rotation of the coils.

As illustrated in FIG. 4B, the concave portions 126 of the guide protrusions 124a and 124b each include a tapered region 126a and a straight region 126b. The tapered region 126a is formed so that a width dimension inside the concave portion 126 is gradually increased from an intermediate position close to the intermediate wall 102b toward a tip position. The straight region 126b is formed to extend from an end of the tapered region 126a to the intermediate wall 102b so that a width dimension inside the concave portion 126 is kept substantially constant. A width dimension of the tapered region 126a is set to be larger than that of the convex portion of the coil described later, and a width dimension of the straight region 126b is set to be slightly larger than that of the convex portion of the coil described later.

Moreover, the intermediate wall 102b is provided with a pair of positioning protrusions 128 protruded toward the cylinder tube 38 of the master cylinder 34. The positioning protrusions 128 are inserted into unillustrated positioning holes formed at an attachment surface of the cylinder tube 38 of the master cylinder 34, and thus the housing 102 is attached to the cylinder tube 38 in a state where the housing 102 is positioned.

Figure 6:
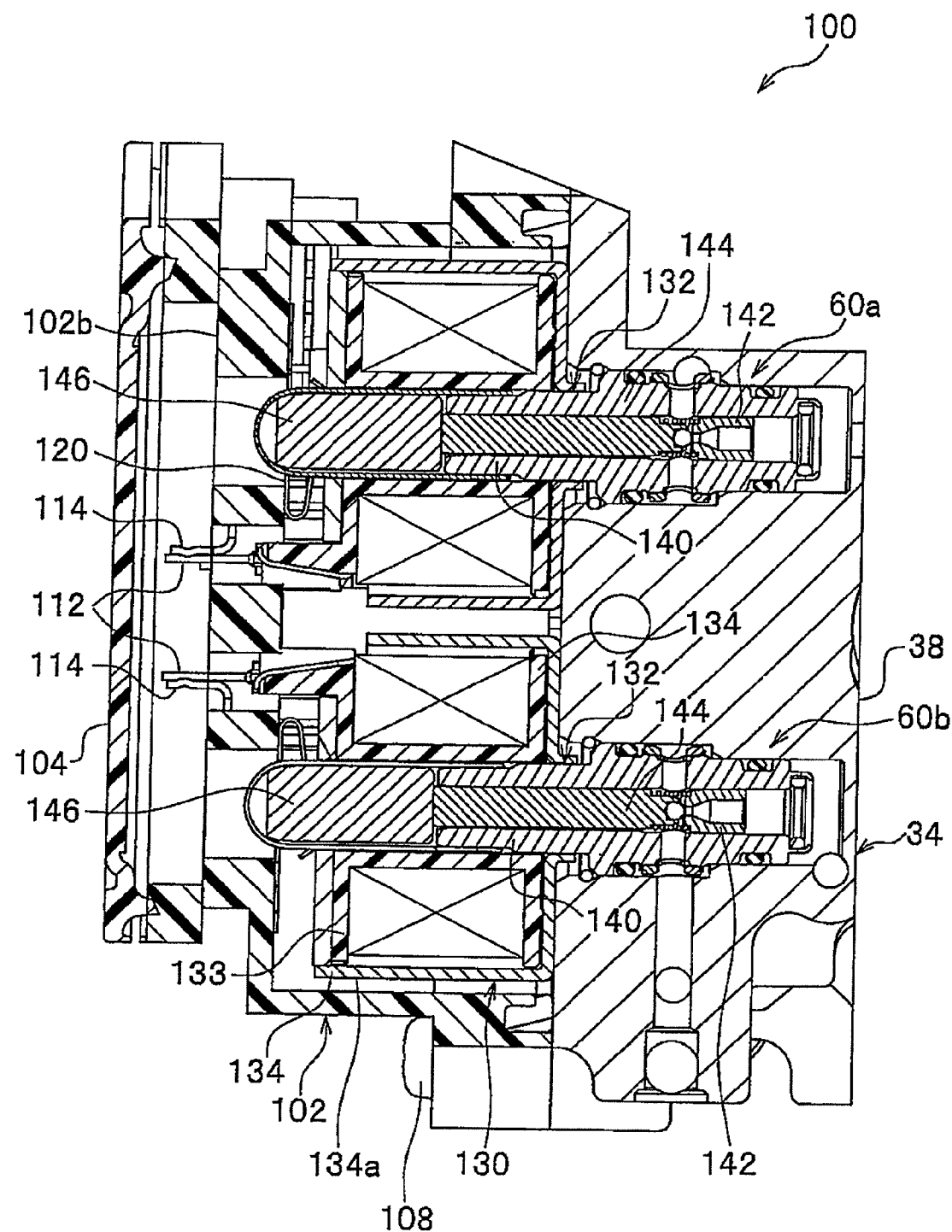
FIG. 6 is a longitudinal cross-sectional view taken along the line VI-VI of FIG. 2.
Figure 7A:
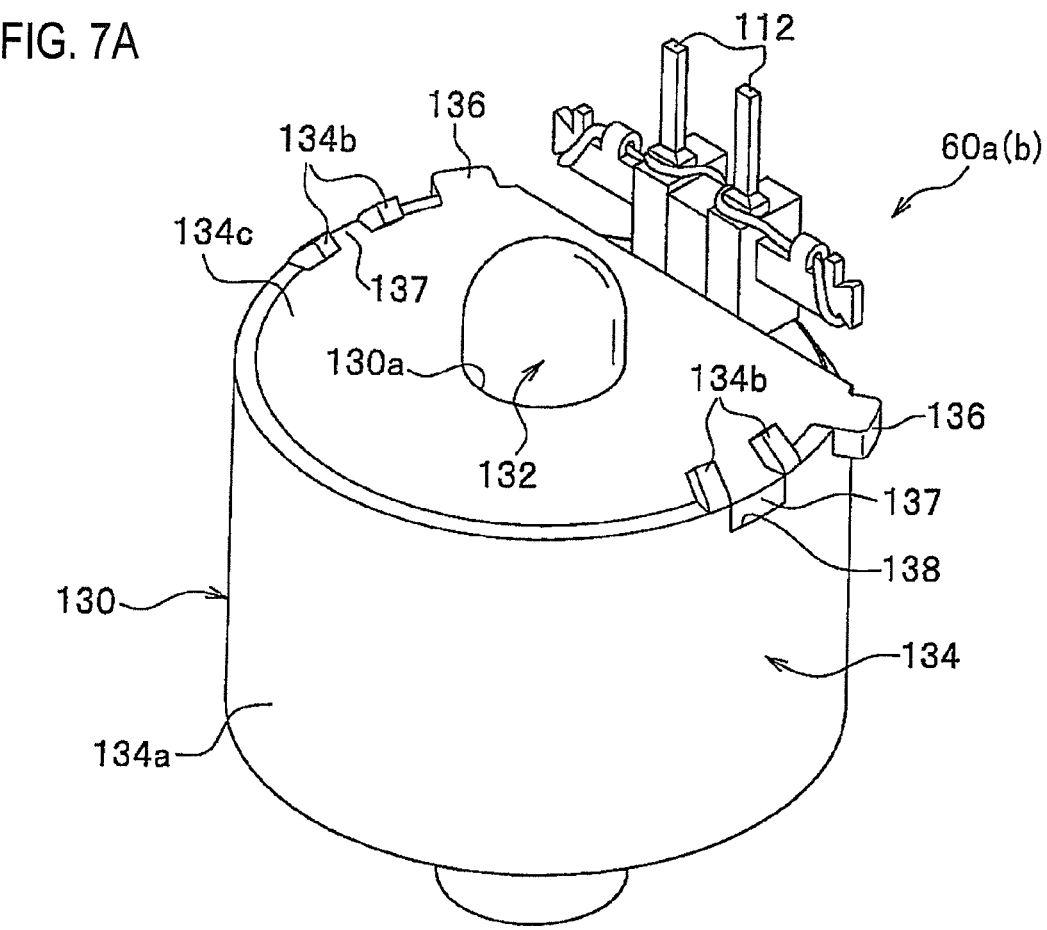
FIG. 7A is a perspective view of a coil and a solenoid valve.
Figure 7B:
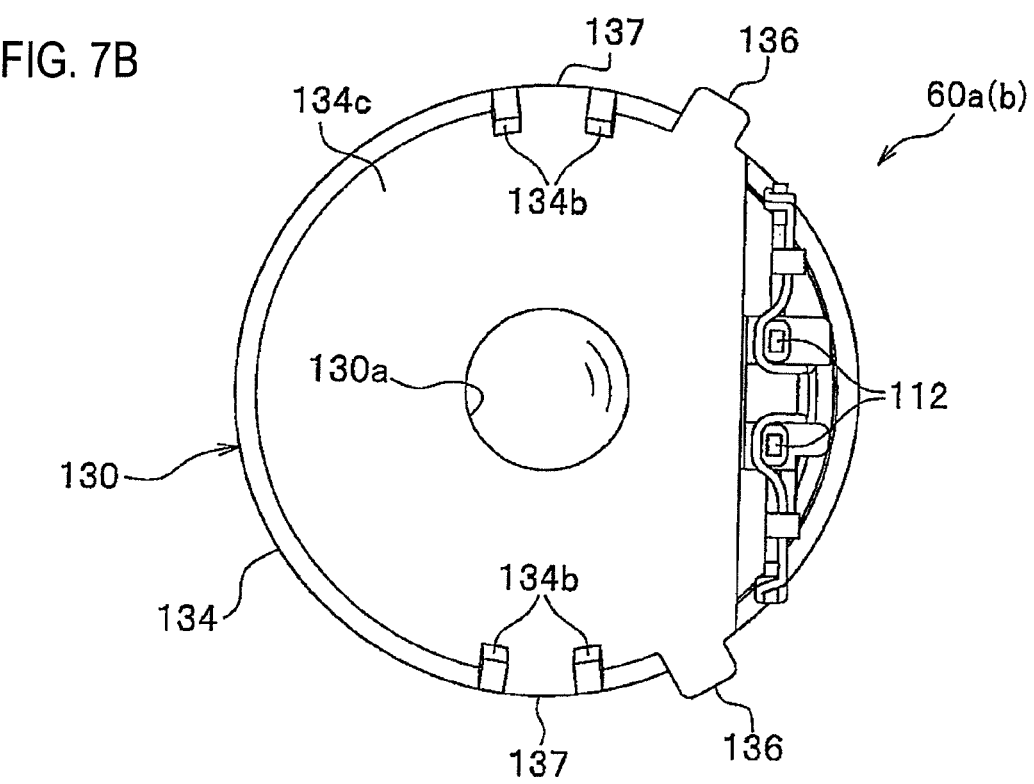
FIG. 7B is a plan view of FIG. 7A.

As illustrated in FIGS. 7A and 7B, the first to third shut-off valves 60a, 60b and 62 each include: the coil (electromagnetic coil) 130 formed into a substantially cylindrical shape; and a solenoid valve 132 inserted into the coil 130 along a center hole 130a of the coil 130. As illustrated in FIG. 6, each coil 130 includes: a bobbin 133 around which a winding is wound; and a yoke 134 that surrounds the bobbin 133 to form a magnetic path.

As illustrated in FIGS. 7A and 7B, the yoke 134 includes: a yoke main body 134a; and a yoke top 134c attached to an upper face of the yoke main body 134a. The yoke top 134c is engaged with the yoke main body 134a by bending claw portions 134b. The yoke top 134c is provided at its outer periphery with a pair of the convex portions 136 which are to be fitted into the concave portions 126 (see FIG. 4B) of the pair of guide protrusions 124a and 124b. The yoke top 134c is further provided at its outer periphery with a pair of engagement portions 137. Each engagement portion 137 is fitted into a groove 138 formed between a pair of the claw portions 134b, 134b, thus achieving a rotation-preventing function.

The convex portions 136 of the coils 130 and the concave portions 126 of the guide protrusions 124a and 124b of the housing 102 function as rotation restricting parts. Specifically, the convex portions 136 of the coils 130 and the concave portions 126 of the guide protrusions 124a and 124b are fitted to each other in a convexo-concave manner, thereby restricting rotational movement of the coils 130 at the time of welding work for the terminals, which will be described later. As illustrated in FIG. 7B, each convex portion 136 has a substantially rectangular shape and is formed so as to be protruded radially outward by a given length. Note that the pair of convex portions 136 provided at each coil 130 are located away from each other by a given angle along a circumferential direction in accordance with the locations of the guide protrusions 124a and 124b.

Further, each yoke main body 134a is provided at its upper part with a pair of the terminals (coil terminals) 112 protruded upward. The terminals 112 are electrically connected to the winding inside the yoke main body 134a, and are welded to the terminals 114 (intra-housing terminals) of the associated bus bars 110. The pair of convex portions 136 of each coil 130 are provided so as to be located adjacent to the terminals 112 of the yoke 134 (i.e., the terminals 112 of the coil 130).

Note that similarly to the solenoid valves 132, the pressure sensors Pp and Pm are also provided with terminals 139 (see FIG. 2). The terminals 139 of the pressure sensors Pp and Pm are welded to and electrically connected to the terminals 114 (intra-housing terminals) of the bus bars 110.

As illustrated in FIG. 6, each solenoid valve 132 includes: a cylindrical fixed core 140; a valve seat 142 attached to inside of a base end side of the fixed core 140; a valve body 144 slidably attached to inside of a tip side of the fixed core 140; and a movable core 146 for pressing the valve body 144 by a magnetization action.

In this case, upon passage of an electric current through the coil 130 externally fitted to the solenoid valve 132 and magnetization of the coil 130, the movable core 146 is attracted and displaced toward the fixed core 140, and the valve body 144 is displaced toward the valve seat 142 accordingly, thereby closing an opening of the valve seat 142. On the other hand, upon suspension of supply of an electric current to the coil 130 and demagnetization of the coil 130, the movable core 146 goes away from the fixed core 140, and the valve body 144 is displaced toward the movable core 146 accordingly, thereby opening the opening of the valve seat 142.

Figure 5:
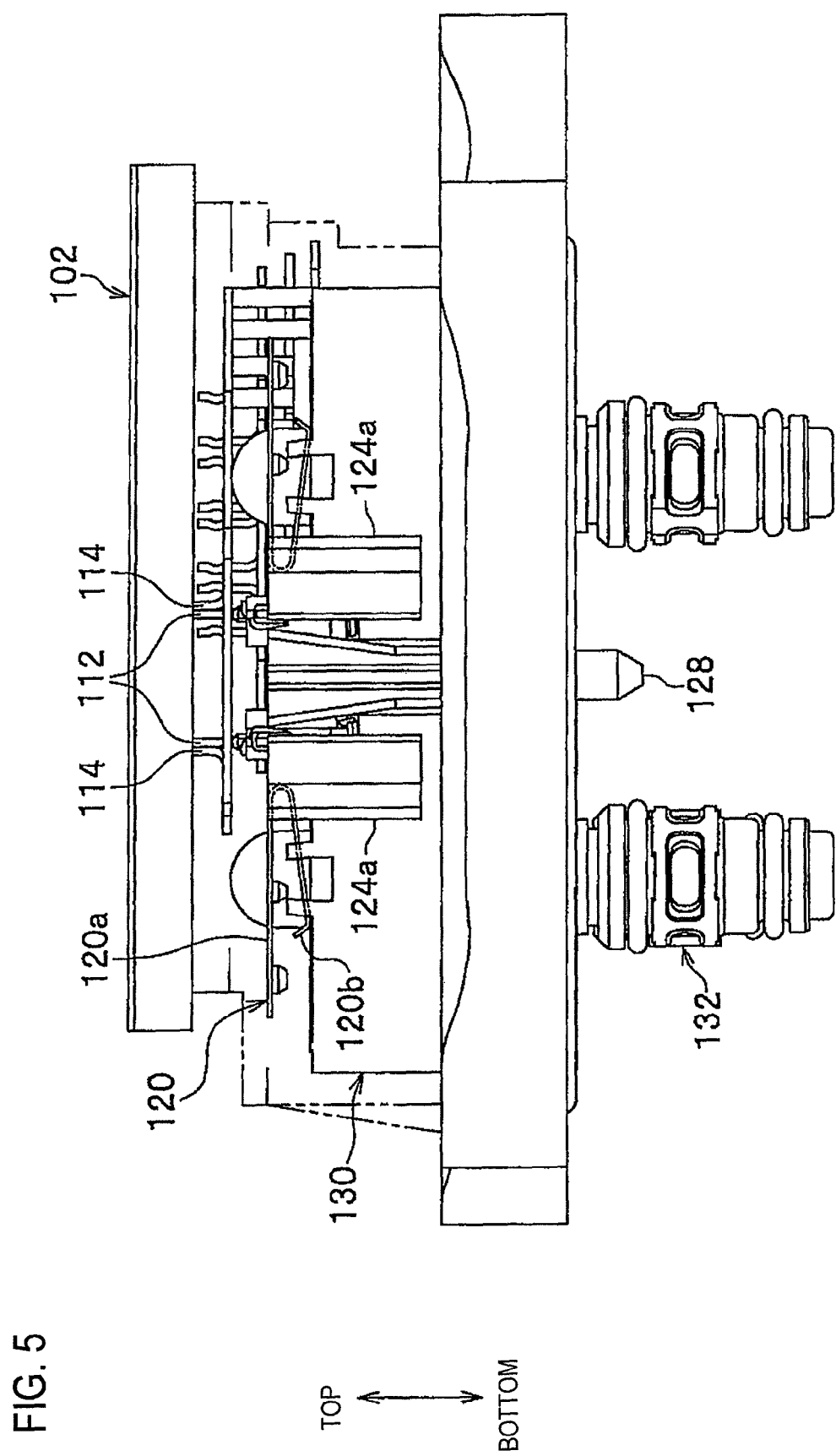
FIG. 5 is a transparent side view transparently illustrating part of the housing.
Figure 11A:
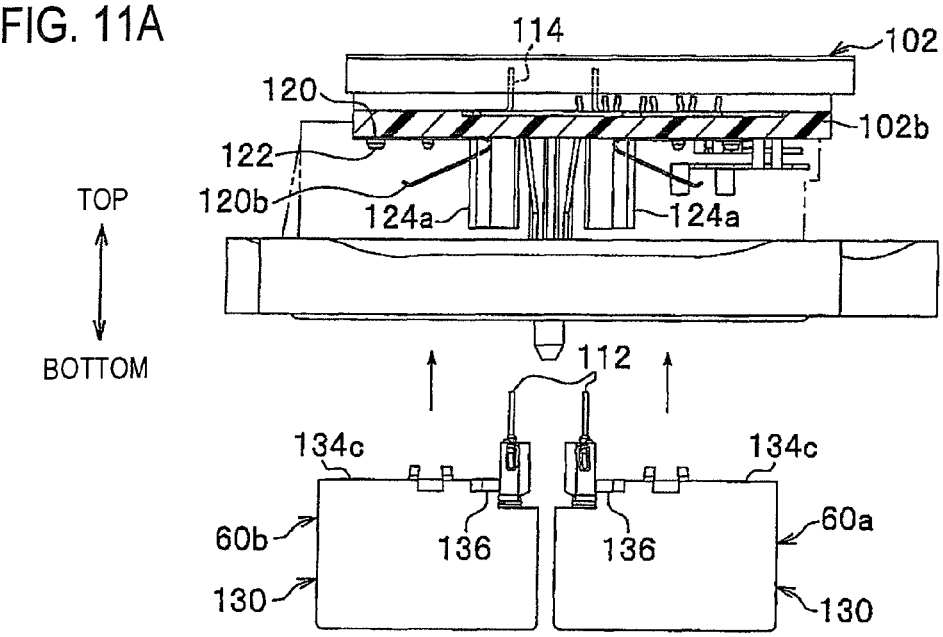
FIGS. 11A to 11C are explanatory diagrams illustrating steps of incorporating the plate springs, coils and solenoid valves into the housing.
Figure 11B:
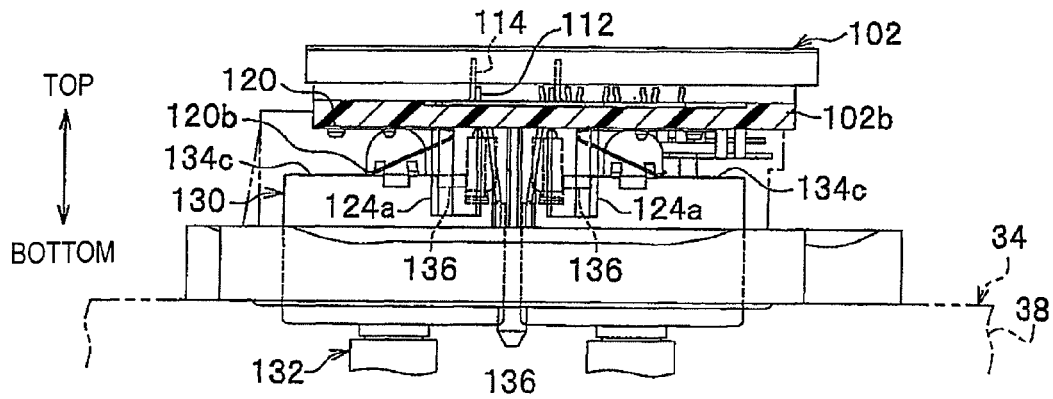

The plate springs (coil urging parts) 120 for urging the coils 130 in a direction in which the coils 130 go away from the intermediate wall 102b are provided between the intermediate wall 102b of the housing 102 and the coils 130 (see FIGS. 5, 11A and 11B; note that in FIG. 5, the illustration of the intermediate wall 102b is omitted).

Figure 8B:
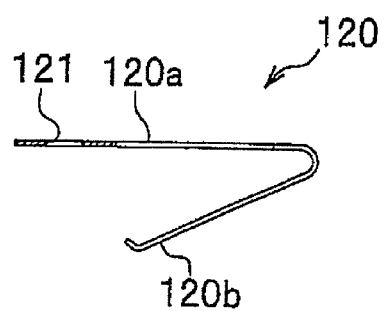
FIG. 8B is a longitudinal cross-sectional view of FIG. 8A.

As illustrated in FIG. 4A, each of the plate springs 120 has: a base portion 120a to be attached to the housing 102 (intermediate wall 102b); and elastic portions 120b that extend from the base portion 120a to press the coil 130. As illustrated in FIG. 10B, the elastic portions 120b each extend from an end of the base portion 120a so as to overlap with the base portion 120a. Note that as illustrated in FIG. 8B and FIG. 9B, the base portion 120a and the elastic portions 120b are substantially V-shaped in side view.

Figure 8A:
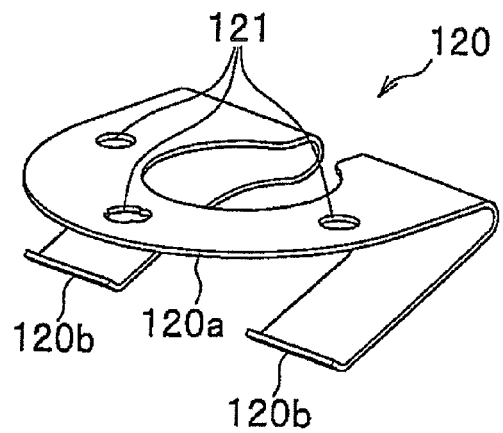
FIG. 8A is a perspective view of a plate spring.
Figure 9A:
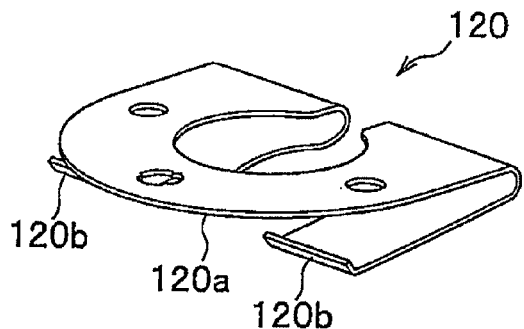
FIG. 9A is a perspective view illustrating a state where elastic portions of the plate spring illustrated in FIGS. 8A and 8B are elastically deformed.
Figure 9B:
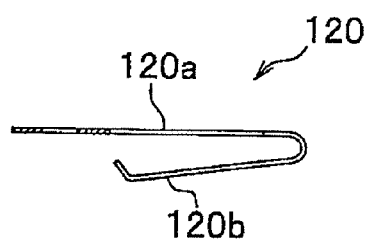
FIG. 9B is a longitudinal cross-sectional view of FIG. 9A.

Each base portion 120a is provided with three holes (held portions) 121 into which the associated three engagement protrusions 122 (see FIG. 4A) of the intermediate wall 102b are to be fitted (see FIG. 8A and FIG. 9A). Note that when the plate spring 120 is fixed to the housing 102 (intermediate wall 102b), one of the three engagement protrusions 122, which is located at the center, has a fixation function for fixing the plate spring 120 to the housing 102, and the right and left engagement protrusions 122 each have both of guide function and rotation-preventing function. In accordance with this, the center hole 121 formed in the base portion 120a functions as a fixation hole, and the right and left holes 121 each function as a guide and rotation-preventing hole.

Each base portion 120a is substantially U-shaped in plan view, and the elastic portions 120b are extended from ends of the base portion 120a (i.e., from fulcrums B described later). Each base portion 120a is provided with a substantially circular opening 123 including a separated region (see FIG. 10A). The two elastic portions 120b are bent from the base portion 120a in the same direction, and are extended substantially in parallel with each other so as to be located away from each other by a given distance. Note that the substantially U-shaped form may have a partially separated shape, and examples of the substantially U-shaped form also include an substantially C-shaped form.

Figure 10A:
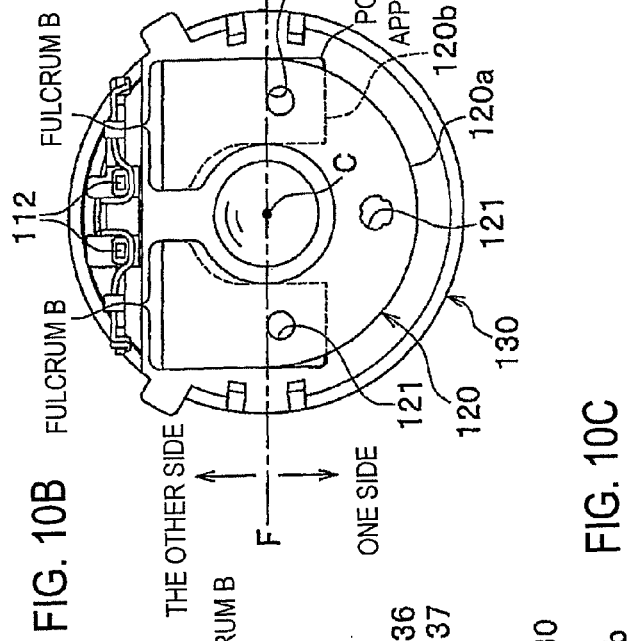
FIG. 10A is a perspective view illustrating a relationship between the plate string and the coil.
Figure 10B:
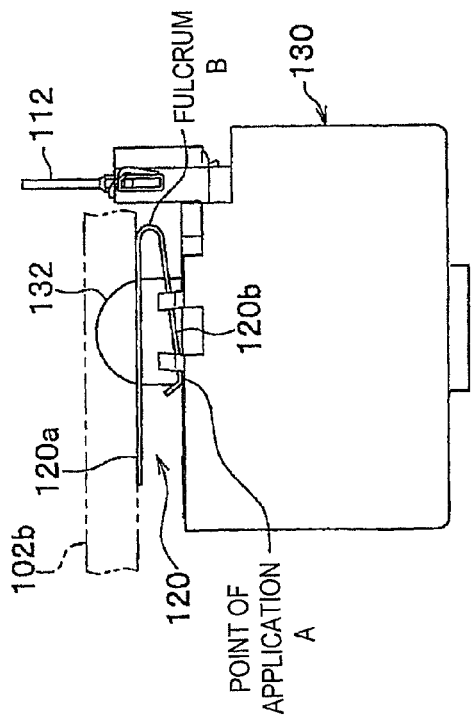
FIG. 10B is a plan view of FIG. 10A.

As illustrated in FIG. 10A, a tip of the solenoid valve 132 passes through the opening 123 of the base portion 120a and a region located between a pair of the elastic portions 120b, 120b. As illustrated in FIG. 4A, the tip of each solenoid valve 132, passed through the opening 123 and the region between the pair of elastic portions 120b, 120b, is inserted through the associated solenoid valve insertion hole 118 of the intermediate wall 102b.

Figure 10C:
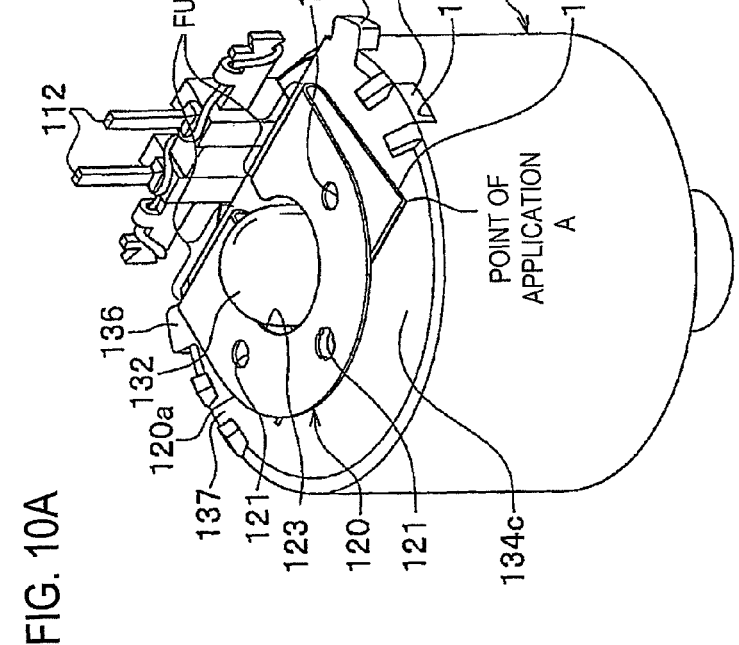
FIG. 10C is a side view of FIG. 10A.

Furthermore, as illustrated in FIG. 10C, bent regions of tips of the elastic portions 120b serve as points of application A at which the elastic portions 120b come into contact with the coil 130, and bent regions between the base portion 120a and the elastic portions 120b serve as the fulcrums B of the elastic portions 120b. In the present embodiment, as illustrated in FIG. 10B, the points of application A and the fulcrums B are located in different regions with reference to a virtual plane F passing through a center axis C of the solenoid valve 132. In other words, the points of application A are located in the region of one side, and the fulcrums B are located in the region of the other side facing the points of application A and opposite to the points of application A.

Moreover, fixation points at which the terminals 112 of the coil 130 and the terminals 114 inside the housing 102 are welded and fixed to each other, and the points of application A at which a pressing force is applied to the coil 130 are separately located in different regions with reference to the virtual plane F passing through the center axis C, thus making it possible to enhance a pressing effect at the time of oscillation of the coil 130 and a rotation-preventing effect for the coil 130.

Besides, the points of application of force (i.e., the points of application A), at which a reaction force from the coil 130 is received, are set so as to be located away from the fixation points, thus making it possible to absorb (buffer) oscillation and rotational movement of the coil 130 by the elastic portions 120b and to suitably avoid transmission of the oscillation and rotational movement to the fixation points.

Figure 11C:
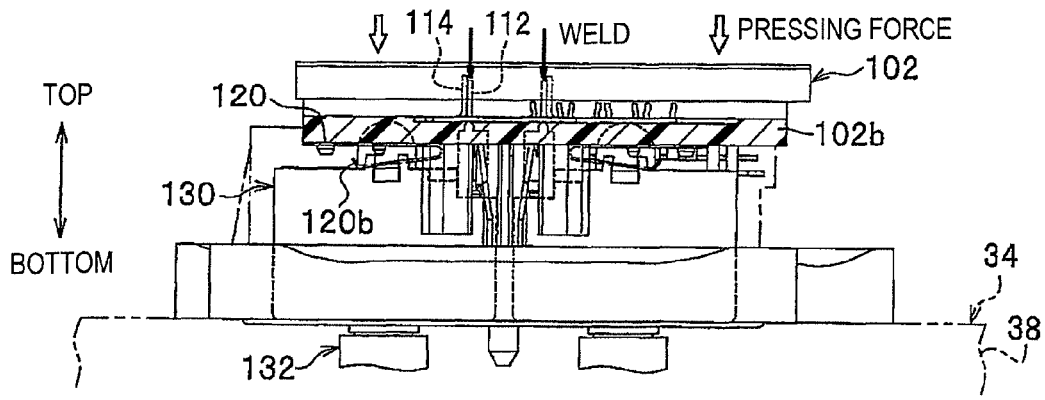

Next, steps of incorporating the plate springs 120, the coils 130 and the solenoid valves 132 into the housing 102 will be schematically described below. FIGS. 11A to 11C are explanatory diagrams illustrating the steps of incorporating the plate springs, the coils and the solenoid valves into the housing. Note that the solenoid valves 132 are attached to the attachment surface of the cylinder tube 38 of the master cylinder 34 in advance.

First, the three engagement protrusions 122 provided at the intermediate wall 102b of the housing 102 are fitted into the holes 121 of the associated plate spring 120, thereby attaching the plate spring 120 to the intermediate wall 102b. In this case, as illustrated in FIG. 11A, the base portion 120a of each plate spring 120 is fixed to the intermediate wall 102b of the housing 102, and the elastic portions 120b of each plate spring 120 are located away from the intermediate wall 102b.

Subsequently, the coils 130 are displaced along the concave portions 126 of the guide protrusions 124a and 124b protruded from the intermediate wall 102b, and are thus attached to the housing 102 (see FIGS. 4A and 4B). In this case, the pair of convex portions 136 provided at each coil 130 and the concave portions 126 of the pair of guide protrusions 124a and 124b are engaged with each other, and the convex portions 136 are guided by the concave portions 126 of the guide protrusions 124a and 124b. Note that the concave portions 126 of the guide protrusions 124a and 124b are each provided with the tapered region 126a whose width dimension is slightly larger than that of the convex portion 136; hence, for example, when the coils 130 are incorporated into the housing 102, the convex portions 136 of the coils 130 can be easily inserted into the concave portions 126 of the guide protrusions 124a and 124b.

As illustrated in FIG. 11B, the coils 130 abut against the elastic portions 120b of the plate springs 120, thereby restricting the displacement of the coils 130. The solenoid valves 132 are inserted along the center holes 130a (see FIGS. 7A and 7B) of the coils 130 and passed therethrough. In this case, circumferential rotation of the coils 130 is prevented by fitting the convex portions 136 and the concave portions 126 to each other; however, positioning of the terminals 112 of the coils 130 has not yet been performed, and the terminals 112 are located at positions slightly vertically deviated from the terminals 114 of the bus bars 110.

Subsequently, as illustrated in FIG. 11C, a pressing force is applied to the housing 102 along the direction indicated by arrows, and the elastic portions 120b of the plate springs 120 are elastically deformed so as to be brought close to the base portions 120a. In the state where the elastic portions 120b of the plate springs 120 are elastically deformed, the terminals 112 of the coils 130 and the terminals 114 (intra-housing terminals) of the bus bars 110, which are positioned at given locations with respect to each other along the vertical direction, are welded to each other. In this case, resistance welding such as projection welding, for example, is carried out. As a result, in the state where the coils 130 are urged by the plate springs 120, the terminals 112 of the coils 130 and the terminals 114 of the bus bars 110 are welded to each other and are thus firmly joined to each other.

In the present embodiment, the elastic portions 120b of each of plate spring 120, which press the coil 130, are extended substantially in parallel with each other from the base portion 120a, thus making it possible to easily manufacture the elastic portions 120b by performing a bending step in only one direction and to reduce manufacturing cost thereof. Note that in the present embodiment, the plate springs 120 are illustrated as the coil urging parts, but the coil urging parts are not limited to the plate springs 120; alternatively, any means may be used as long as it exerts a pressing force (elastic force) so as to press the coils 130 toward the member to which the housing 102 is to be attached.

Further, in the present embodiment, each base portion 120a is substantially U-shaped in plan view, and the elastic portions 120b are extended from the separated ends of each base portion 120a; thus, loads of the elastic portions 120b to be applied to the coil 130 can be easily set. Note that each base portion 120a may be formed into a partially separated shape, and examples of the base portion 120a also include one that is substantially C-shaped in plan view.

Furthermore, according to this embodiment, each base portion 150a is substantially O-shaped in plan view, and elastic portions 150b are extended from fulcrums B of the base portion 150a, thus making it possible to increase loads applied to the elastic portions 150b. Note that each base portion 150a may have an endless shape formed continuously without being separated.

Moreover, in the present embodiment, when the housing 102 is attached to the cylinder tube 38 of the master cylinder 34, the tip of the solenoid valve 132 passes through the center of the base portion 120a (see FIG. 10A), thus making it possible to avoid interference of the plate spring 120 with the solenoid valve 132. Consequently, a resulting solenoid valve drive assembly can be prevented from being unnecessarily increased in size.

Besides, in the present embodiment, there are provided the holes 121 which are to be held by the engagement protrusions 122 of the housing 102 (intermediate wall 102b); thus, in the state where the plate springs 120 are interposed between the coils 130 and the housing 102 in advance so that the coils 130 are urged, the housing 102 can be easily attached to the cylinder tube 38 of the master cylinder 34 (FIGS. 11A to 11C).

Further, in the state where the coils 130 are urged by the plate springs 120, the terminals 112 of the coils 130 and the terminals 114 inside the housing 102 can be easily welded to each other. Specifically, as illustrated in FIG. 11A, a length of protrusion of each of the guide protrusions 124a and 124b from the intermediate wall 102b toward the cylinder tube 38 of the master cylinder 34 is set to be larger than a height dimension of each plate spring 120 measured before elastic deformation thereof (i.e., a length of each plate spring 120 measured along the vertical direction before elastic deformation thereof); therefore, the convex portions 136 of the coils 130 and the concave portions 126 of the guide protrusions 124a and 124b can be easily fitted to each other prior to abutment of the coils 130 against the plate springs 120.

In the present embodiment, when the coils 130 are welded to the housing 102, the terminals 112 of the coils 130 and the terminals 114 inside the housing 102 can be welded to each other in the state where the convex portions 136 of the coils 130 and the concave portions 126 of the guide protrusions 124a and 124b are engaged with each other and rotation of the coils 130 is prevented at regions other than the welded regions (connection regions) where the terminals 112 of the coils 130 and the terminals 114 inside the housing 102 are welded (connected) to each other. As a result, welding workability can be improved.

Further, in the present embodiment, no special jig is used, and prevention of rotation of the coils 130 and vertical positioning are enabled by using a simple structure consisting of the convex portions 136 of the coils 130 and the concave portions 126 of the guide protrusions 124a and 124b; hence, the terminals 112 of the coils 130 into which the solenoid valves 132 are incorporated and the terminals 114 inside the housing 102 can be easily welded to each other.

Furthermore, in the present embodiment, the convex portions 136 of the coils 130 and the concave portions 126 of the guide protrusions 124a and 124b provided at the housing 102 are fitted to each other in a convexo-concave manner, thus making it possible to easily prevent rotation of the coils 130 with respect to the housing 102.

Moreover, in the present embodiment, the convex portions 136 for preventing rotation of the coils 130 are provided at the yokes 134, thus making it possible to easily achieve the rotation-preventing function with the use of the yokes 134 included in the coils 130.

Besides, in the present embodiment, the convex portions 136 protruded outward in the radial direction of each coil 130, and the concave portions 126 of the guide protrusions 124a and 124b of the housing 102 are provided so that the convex portions 136 and the concave portions 126 can be easily fitted to each other in a convexo-concave manner.

Further, in the present embodiment, even when the plate springs 120 for urging the coils 130 toward the cylinder tube 38 of the master cylinder 34 (i.e., toward the member to which the housing 102 is to be attached) are interposed between the housing 102 and the coils 130, the terminals 112 of the coils 130 and the terminals 114 inside the housing 102 can be easily connected to each other in the state where the coils 130 are urged by the plate springs 120. Note that in the present embodiment, the plate springs 120 are illustrated as the coil urging parts, but the coil urging parts are not limited to the plate springs 120; alternatively, any means may be used as long as it exerts a pressing force (elastic force) so as to press the coils 130 toward the member to which the housing 102 is to be attached.

In the present embodiment, the bus bars 110 and 110a function as reinforcement members for the intermediate wall (attachment wall) 102b, and regions where the plate springs 120 are to be attached will be reinforced by the bus bars 110 or 110a. Thus, for example, even when an additional reinforcement member is not provided in the housing 102, the intermediate wall (attachment wall) 102b is not increased in thickness or a rib shape is not provided, the strength of the intermediate wall (attachment wall) 102b can be enhanced, which eventually enables adaptation to size increase of the coils 130 located inside the housing 102. As a result, in the present embodiment, size and weight of the housing 102 can be prevented from being unnecessarily increased, and an increase in the number of components can be avoided.

Furthermore, in the present embodiment, since the conductor portions 113 of the bus bars 110 or 110a are provided with the wide portions 114a (see FIG. 15) or branch portions 111 (see FIG. 14), the ratio of area of the bus bars 110 or 110a to the area of the intermediate wall (attachment wall) 102b is increased, thus making it possible to further increase the strength of the intermediate wall (attachment wall) 102b by the strength of the bus bars 110 or 110a themselves.

Moreover, in the present embodiment, even when the coils 130 that are easily influenced by oscillation from outside are increased in size compared with conventional ones and the coils 130 are held (urged) by the plate springs 120, the strength of the intermediate wall (attachment wall) 102b of the housing 102, to which the plate springs 120 are attached, can be enhanced. Note that in the present embodiment, the plate springs 120 are illustrated as the electric component urging parts, but the electric component urging parts are not limited to the plate springs 120. Further, in the present embodiment, the coils 130 for driving the solenoid valves 132 are illustrated as electric components, but the electric components are not limited to the coils 130.

Besides, in the present embodiment, the pressure sensors Pp and Pm for controlling brake fluid pressure can be arranged collectively inside the housing 102 together with the coils 130, the solenoid valves 132 and the plate springs 120. As a result, in the present embodiment, reduction in size and weight of the housing 102 can be promoted.

Furthermore, in the present embodiment, the length of protrusion of each of the guide protrusions 124a and 124b from the intermediate wall 102b toward the cylinder tube 38 of the master cylinder 34 is set to be equal to or larger than the height dimension of each plate spring 120, and therefore, the positioning of the terminals 112 of the coils 130 and the terminals 114 inside the housing 102 is easily performed, thus simplifying the welding of the terminals 112 and the terminals 114.

Specifically, as illustrated in FIG. 11A, the length of protrusion of each of the guide protrusions 124a and 124b from the intermediate wall 102b toward the cylinder tube 38 of the master cylinder 34 is set to be larger than the height dimension of each plate spring 120 measured before elastic deformation thereof (i.e., the length of each plate spring 120 measured along the vertical direction before elastic deformation thereof); therefore, the convex portions 136 of the coils 130 and the concave portions 126 of the guide protrusions 124a and 124b can be easily fitted to each other prior to abutment of the coils 130 against the plate springs 120.

After the convex portions 136 of the coils 130 and the concave portions 126 of the guide protrusions 124a and 124b have been fitted to each other, the elastic portions 120b of the plate springs 120 abut against the upper faces (yoke tops 134c) of the coils 130 due to guide functions of the concave portions 126 of the guide protrusions 124a and 124b as illustrated in FIG. 11B.

Moreover, as illustrated in FIG. 11C, in the state where the elastic portions 120b of the plate springs 120 are elastically deformed due to application of pressing forces thereto, the vertical positioning of the terminals 112 of the coils 130 and the terminals 114 inside the housing 102 is easily carried out, thus making it possible to easily perform the welding of the terminals 112 of the coils 130 and the terminals 114 inside the housing 102 while maintaining the state in which the terminals 112 and 114 are positioned.

Besides, in the present embodiment, the cylinder tube 38 of the master cylinder 34, to which the housing 102 is to be attached, is formed by aluminum or an aluminum alloy, thus allowing the cylinder tube 38 to be used as a heat dissipating/absorbing member (heat sink) for the coils 130.

Furthermore, in the present embodiment, the pressure sensors (fluid pressure sensors) Pp and Pm for detecting brake fluid pressures are provided inside the housing 102, and the terminals 139 of the pressure sensors Pp and Pm are also electrically connected to the terminals 114 inside the housing 102 (i.e., the terminals 114 of the bus bars 110).

Accordingly, an electric connection structure of the solenoid valve drive assembly can be suitably used for the brake control apparatus 100; in addition, similarly to the solenoid valves 132, the pressure sensors Pp and Pm for controlling the brake fluid pressure can also be contained inside the housing 102. As a result, size reduction of the housing 102 can be promoted.

Note that although the brake control apparatus 100 suitably used for a four-wheel car has been illustrated in the present embodiment, the above-described technical features may be applied to a brake control apparatus used for a motorcycle without any trouble. Further, although the brake control apparatus 100 is illustrated as an example of the solenoid valve drive assembly, the present invention is not limited to this example.

Figure 12A:
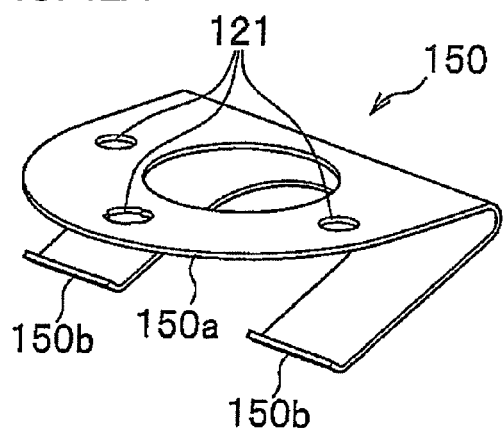
FIG. 12A is a perspective view illustrating another embodiment of the plate spring.
Figure 12B:
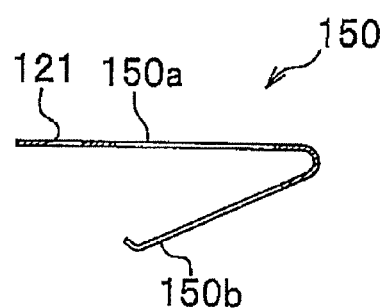
FIG. 12B is a longitudinal cross-sectional view of FIG. 12A.
Figure 13A:
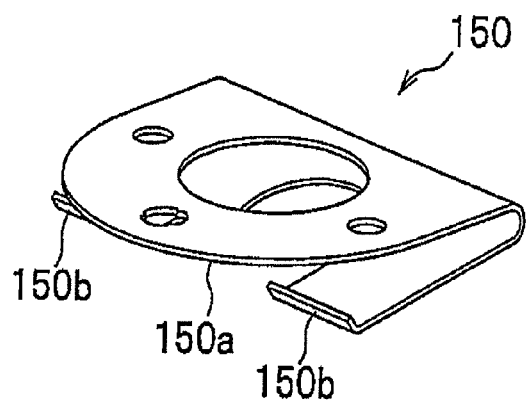
FIG. 13A is a perspective view illustrating a state where elastic portions of the plate spring illustrated in FIGS. 12A and 12B are elastically deformed.
Figure 13B:
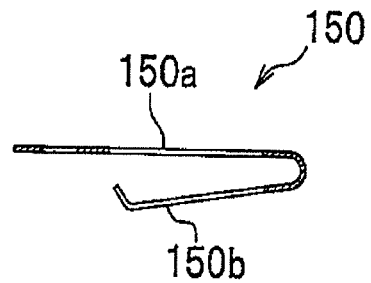

FIG. 12A and FIG. 13A are perspective views illustrating a plate spring according to another embodiment.

In the plate spring 120 illustrated in FIGS. 8A, 8B, 9A and 9B, the base portion 120a is formed so as to be separated; however, as illustrated in FIGS. 12A, 12B, 13A and 13B, the plate spring 150 according to another embodiment is different from the plate spring 120 in that the base portion 150a is substantially O-shaped in plan view. The base portion 150a is formed continuously without any cut, thus making it possible to increase a spring load (reaction force) at the time of elastic deformation of the elastic portions 150b. Note that the shape of each plate spring functioning as the coil urging part is not limited to the shape of the plate spring 120 illustrated in FIGS. 8A, 8B, 9A and 9B and the shape of the plate spring 150 illustrated in FIGS. 12A, 12B, 13A and 13B, but the plate springs may be formed into other shapes.

Figure 14:
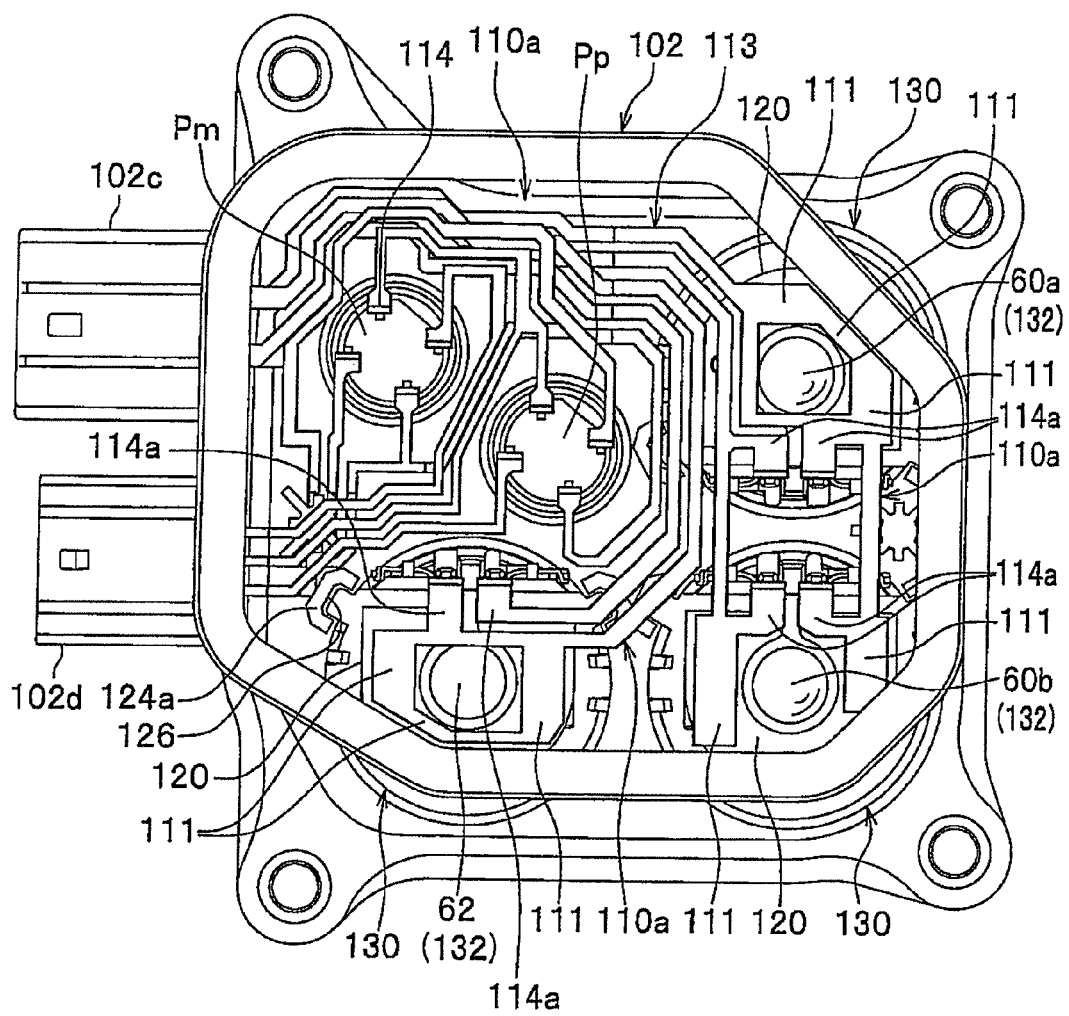
FIG. 14 is a plan view illustrating a state where an intermediate wall is removed and bus bars according to another embodiment are exposed to outside.

FIG. 14 is a plan view illustrating a state where the intermediate wall is removed and the bus bars according to another embodiment are exposed to outside. As illustrated in FIG. 14, the bus bars 110a according to another embodiment are provided with the branch portions 111 at regions other than regions where the terminals 114 are located. The branch portions 111 are formed so as to be wider than the conductor portions 113 of the bus bars 110a, and are provided so as to branch off from the conductor portions 113 at positions immediately above the plate springs 120. As a result, the reinforced strength of the intermediate wall 102b formed by a resin material can be further enhanced.

As illustrated in FIG. 14, for example, at a region close to the first shut-off valve 60a, the two branch portions 111, 111 are formed to branch off (extend) substantially orthogonally from the conductor portion 113 of the single bus bar 110a, and ends of these branch portions 111, 111 are connected to each other via the other branch portion 111, thus exposing a head portion of the solenoid valve 132 through an opening and surrounding the solenoid valve 132 continuously (without any cut).

Further, at a region close to the third shut-off valve 62, the two branch portions 111, 111 are each formed to branch off (extend) from the conductor portion 113 of the single bus bar 110a toward a lower position in FIG. 14, and ends of these branch portions 111, 111 are connected to each other via the other branch portion 111, thus exposing a head portion of the solenoid valve 132 through an opening and surrounding the solenoid valve 132 continuously (without any cut).

Moreover, at a region close to the second shut-off valve 60b, one of the branch portions 111 is formed to branch off (extend) straightly toward a lower position in FIG. 14 from the conductor portion 113 of the single bus bar 110a, and the other branch portion 111 is formed to branch off (extend) straightly toward a lower position in FIG. 14 from the conductor portion 113 of the other single bus bar 110a different from the above single bus bar 110a, so that these branch portions 111, each of which is supported in a cantilever manner, are arranged substantially in parallel with each other.

As described above, a plurality of the branch portions 111 are provided at positions located immediately above the plate springs (coil urging parts) 120 and in regions where the plate springs 120 are attached to the intermediate wall (attachment wall) 102b, thus making it possible to reduce the area of only a resin portion of the intermediate wall 102b (i.e., a portion of the intermediate wall 102b, which is made of rein) and to further enhance the strength of the intermediate wall 102b.

What is claimed is:

1. An electric connection structure of a solenoid valve drive assembly, which comprises a solenoid valve, a coil that drives the solenoid valve, and a housing in which the solenoid valve and the coil are located, so that a terminal of the coil and a terminal inside the housing are electrically connected to each other, the electric connection structure comprising
    a coil urging part that urges the coil, the coil urging part provided between the housing and the coil,
    wherein the coil urging part is a leaf spring and has: a base portion to be attached to the housing; and an elastic portion that is bent from the base portion and faces a surface of the base portion to press the coil.

2. The electric connection structure of the solenoid valve drive assembly according to claim 1,
    wherein the base portion is substantially U-shaped in plan view, and
    wherein the elastic portion is extended from each of ends of the base portion.

3. The electric connection structure of the solenoid valve drive assembly according to claim 1,
    wherein the base portion is substantially O-shaped in plan view.

4. The electric connection structure of the solenoid valve drive assembly according to claim 2,
    wherein the solenoid valve passes through a center of the base portion.

5. The electric connection structure of the solenoid valve drive assembly according to claim 1,
    wherein the coil urging part has a held portion to be held by the housing.

6. The electric connection structure of the solenoid valve drive assembly according to claim 1,
    wherein the coil and the housing comprise a rotation restricting part that restricts rotation of the coil at a region other than a connection region where the terminal of the coil and the terminal inside the housing are connected to each other.

7. The electric connection structure of the solenoid valve drive assembly according to claim 6,
    wherein the rotation restricting part restricts rotation of the coil by means of concavo-convex fitting of the coil and the housing.

8. The electric connection structure of the solenoid valve drive assembly according to claim 7,
    wherein the coil comprises: a bobbin around which a winding is wound; and a yoke that surrounds the bobbin to form a magnetic path, and
    wherein either one of concave and convex portions included in the rotation restricting part is provided at the yoke.

9. The electric connection structure of the solenoid valve drive assembly according to claim 8,
    wherein the rotation restricting part comprises: a convex portion that is located at a region of the yoke on a side of the terminal of the coil, and that is protruded outward in a radial direction of the coil; and a concave portion formed at an intermediate wall of the housing.

10. The electric connection structure of the solenoid valve drive assembly according to claim 9,
    wherein a coil urging part that urges the coil toward a member to which the housing is to be attached is provided between the housing and the coil,
    wherein the concave portion has: a straight region provided adjacent to the intermediate wall and having a width dimension substantially corresponding to that of the convex portion; and a tapered region which is provided so as to be located away from the intermediate wall and by which a width dimension inside the concave portion is gradually increased, wherein the concave portion is provided at a protrusion protruded from the intermediate wall inside the housing, and wherein a protruded length of the protrusion is set to be equal to or larger than a height dimension of the coil urging part.

11. The electric connection structure of the solenoid valve drive assembly according to claim 6, wherein the coil urging part that urges the coil toward a member, attached to the housing, is provided between the housing and the coil.

12. The electric connection structure of the solenoid valve drive assembly according to claim 6, wherein a member to which the housing is to be attached is formed by aluminum or an aluminum alloy.

13. A vehicle brake fluid pressure control apparatus that controls a vehicle brake fluid pressure, the apparatus comprising the solenoid valve drive assembly according to claim 6, wherein a fluid pressure sensor that detects the brake fluid pressure is provided inside the housing, and wherein a terminal of the fluid pressure sensor is electrically connected to the terminal inside the housing.

14. A solenoid valve drive assembly comprising the electric connection structure according to claim 1, the solenoid valve drive assembly comprising a bus bar electrically connected to the coil, wherein the housing has an attachment wall in which the bus bar is buried, wherein the coil urging part is provided between the attachment wall and the coil, and wherein the bus bar is buried at least in a region of the attachment wall where the coil urging part is to be attached.

15. The solenoid valve drive assembly according to claim 14, wherein the bus bar has a wide portion formed so as to be wider than another portion of the bus bar.

16. The solenoid valve drive assembly according to claim 14, wherein the bus bar has a conductor portion, and the conductor portion is provided with a branch portion branching off therefrom.

17. The solenoid valve drive assembly according to claim 14, wherein the coil urging part comprises a plate spring that urges the coil.

18. A vehicle brake fluid pressure control apparatus for controlling a brake fluid pressure, the apparatus comprising the solenoid valve drive assembly according to claim 14, wherein the solenoid valve serves to control a brake fluid pressure.

19. An electric connection structure of a solenoid valve drive assembly, which comprises a solenoid valve, a coil that drives the solenoid valve, and a housing in which the solenoid valve and the coil are located, so that a terminal of the coil and a terminal inside the housing are electrically connected to each other, the electric connection structure comprising:

a coil urging part that urges the coil, the coil urging part provided between the housing and the coil, wherein the coil urging part has: a base portion to be attached to the housing; and an elastic portion that is bent from the base portion and opposes a surface of the base portion to press the coil;

wherein the elastic portion includes two elastic leg portions with a space therebetween;

wherein each of the legs oppose the surface of the base portion;

wherein each of the legs include a bent tip extending towards the surface of the base portion;

wherein the base portion is substantially U-shaped in plan view; and wherein the base portion is provided with a substantially circular opening including a separated region.

20. The electric connection structure of the solenoid valve drive assembly according to claim 19, wherein the separated region of the base portion comprises a space opening to the substantially circular opening; and wherein the two elastic leg portions are bent from the base portion in the same direction, and are extended substantially in parallel with each other so as to be located away from each other by a given distance.

21. The electric connection structure of the solenoid valve drive assembly according to claim 20, wherein the space between the two elastic leg portions and the substantially circular opening are dimensioned such that a solenoid valve of the solenoid valve drive assembly can extend there through in an assembled state.

22. An electric connection structure of a solenoid valve drive assembly, which comprises a solenoid valve, a coil that drives the solenoid valve, and a housing in which the solenoid valve and the coil are located, so that a terminal of the coil and a terminal inside the housing are electrically connected to each other, the electric connection structure comprising a coil urging part that urges the coil, the coil urging part provided between the housing and the coil, wherein the coil urging part has: a base portion to be attached to the housing; and an elastic portion with legs that are bent from the base portion and faces a surface of the base portion to press the coil.

* * * * *